(12) United States Patent
Ouziel et al.

(10) Patent No.: US 11,461,244 B2
(45) Date of Patent: Oct. 4, 2022

(54) CO-EXISTENCE OF TRUST DOMAIN ARCHITECTURE WITH MULTI-KEY TOTAL MEMORY ENCRYPTION TECHNOLOGY IN SERVERS

(71) Applicant: Intel Corporation, Santa Clara, CA (US)

(72) Inventors: Ido Ouziel, Ein Carmel (IL); Arie Aharon, Haifa (IL); Dror Caspi, Kiryat Yam (IL); Baruch Chaikin, D.N. Misagv (IL); Jacob Doweck, Haifa (IL); Gideon Gerzon, Zichron Yaakov (IL); Barry E. Huntley, Hillsboro, OR (US); Francis X. McKeen, Portland, OR (US); Gilbert Neiger, Portland, OR (US); Carlos V. Rozas, Portland, OR (US); Ravi L. Sahita, Portland, OR (US); Vedvyas Shanbhogue, Austin, TX (US); Assaf Zaltsman, Tel Aviv (IL); Hormuzd M. Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 958 days.

(21) Appl. No.: 16/227,386

(22) Filed: Dec. 20, 2018

(65) Prior Publication Data

US 2020/0201786 A1 Jun. 25, 2020

(51) Int. Cl.
*G06F 11/30* (2006.01)
*G06F 12/14* (2006.01)
(Continued)

(52) U.S. Cl.
CPC ...... *G06F 12/1408* (2013.01); *G06F 9/45558* (2013.01); *G06F 11/0745* (2013.01);
(Continued)

(58) Field of Classification Search
CPC ............ G06F 11/0745; G06F 12/0246; G06F 12/0828; G06F 12/1009; G06F 12/1036;
(Continued)

(56) References Cited

U.S. PATENT DOCUMENTS

| 7,216,215 B2 * | 5/2007 | Lee | ..................... G06F 9/30032 |
| | | | 712/E9.034 |
| 8,958,817 B1 * | 2/2015 | Murphy | .................. H04W 4/02 |
| | | | 455/456.3 |

(Continued)

OTHER PUBLICATIONS

"Intel Architecture Memory Encryption Technoogies Specification" Dec. 2017, Intel Corporation, 30 pages.
(Continued)

*Primary Examiner* — Gary S Gracia
(74) *Attorney, Agent, or Firm* — Nicholson De Vos Webster & Elliott LLP

(57) ABSTRACT

Implementations described provide hardware support for the co-existence of restricted and non-restricted encryption keys on a computing system. Such hardware support may comprise a processor having a core, a hardware register to store a bit range to identify a number of bits, of physical memory addresses, that define key identifiers (IDs) and a partition key ID identifying a boundary between non-restricted and restricted key IDs. The core may allocate at least one of the non-restricted key IDs to a software program, such as a hypervisor. The core may further allocate a restricted key ID to a trust domain whose trust computing base does not comprise the software program. A memory controller coupled to the core may allocate a physical page of a memory to the trust domain, wherein data of the physical page of the memory is to be encrypted with an encryption key associated with the restricted key ID.

23 Claims, 20 Drawing Sheets

(51) Int. Cl.
*G06F 9/455* (2018.01)
*G06F 11/07* (2006.01)
*G06F 12/02* (2006.01)
*G06F 12/0817* (2016.01)
*G06F 21/53* (2013.01)
*G06F 21/57* (2013.01)
*G06F 21/60* (2013.01)
*G06F 21/79* (2013.01)

(52) U.S. Cl.
CPC ...... *G06F 12/0246* (2013.01); *G06F 12/0828* (2013.01); *G06F 12/1475* (2013.01); *G06F 12/1483* (2013.01); *G06F 21/53* (2013.01); *G06F 21/57* (2013.01); *G06F 21/602* (2013.01); *G06F 21/79* (2013.01); *G06F 2212/1052* (2013.01); *G06F 2212/2022* (2013.01); *G06F 2212/402* (2013.01); *G06F 2212/7201* (2013.01); *G06F 2212/7202* (2013.01)

(58) Field of Classification Search
CPC ............. G06F 12/1408; G06F 12/1441; G06F 12/1475; G06F 12/1483; G06F 21/53; G06F 21/57; G06F 21/79; G06F 2212/1052; G06F 2212/151; G06F 2212/2022; G06F 2212/402; G06F 2212/651; G06F 2212/683; G06F 2212/7201; G06F 2212/7202; G06F 9/45558

See application file for complete search history.

(56) References Cited

U.S. PATENT DOCUMENTS

| | | | | |
|---|---|---|---|---|
| 9,983,410 | B2* | 5/2018 | Nguyen | H04W 12/33 |
| 11,349,659 | B2* | 5/2022 | Bhatnagar | H04L 63/0428 |
| 2003/0061499 | A1* | 3/2003 | Durrant | G06F 21/85 |
| | | | | 713/189 |
| 2003/0074612 | A1* | 4/2003 | Hou | G11C 29/72 |
| | | | | 714/723 |
| 2006/0101226 | A1* | 5/2006 | Benhase | G06F 12/1081 |
| | | | | 711/E12.067 |
| 2008/0228989 | A1* | 9/2008 | Bancel | G06F 21/79 |
| | | | | 711/E12.001 |
| 2010/0134415 | A1* | 6/2010 | Iwase | G06F 3/04845 |
| | | | | 345/173 |
| 2011/0305333 | A1* | 12/2011 | Jacobson | H04L 9/3297 |
| | | | | 380/44 |
| 2013/0121093 | A1* | 5/2013 | Morimoto | G11C 8/04 |
| | | | | 365/189.15 |
| 2013/0232344 | A1* | 9/2013 | Johnson | G06F 21/645 |
| | | | | 713/193 |
| 2014/0047236 | A1* | 2/2014 | Russell | H04L 63/166 |
| | | | | 713/168 |
| 2014/0258736 | A1* | 9/2014 | Merchan | H04L 9/0866 |
| | | | | 713/193 |
| 2015/0254325 | A1* | 9/2015 | Stringham | G06F 16/9535 |
| | | | | 707/737 |
| 2016/0050202 | A1* | 2/2016 | Swallow | H04L 63/0853 |
| | | | | 726/9 |
| 2017/0010982 | A1* | 1/2017 | Avanzi | G06F 21/14 |
| 2017/0085542 | A1* | 3/2017 | Avanzi | G06F 11/0727 |
| 2017/0177862 | A1* | 6/2017 | Narendra Trivedi | G06F 3/0604 |
| 2017/0185529 | A1* | 6/2017 | Chhabra | G06F 12/023 |
| 2018/0011802 | A1* | 1/2018 | Ndu | G06F 21/602 |
| 2018/0046823 | A1* | 2/2018 | Durham | H04L 9/08 |
| 2018/0095898 | A1* | 4/2018 | Khosravi | G06F 12/1475 |
| 2018/0129611 | A1* | 5/2018 | Parker | G06F 12/10 |
| 2018/0150251 | A1* | 5/2018 | Parker | G06F 12/1009 |
| 2018/0150413 | A1* | 5/2018 | Parker | G06F 12/1425 |
| 2018/0173641 | A1* | 6/2018 | Parker | G06F 12/1009 |
| 2018/0173645 | A1* | 6/2018 | Parker | G06F 12/1036 |
| 2018/0191716 | A1* | 7/2018 | Chhabra | H04L 9/3242 |
| 2018/0373765 | A1* | 12/2018 | Kaliavaradhan | G06F 16/2465 |
| 2019/0018800 | A1* | 1/2019 | Jayasena | G06F 9/4856 |
| 2019/0042476 | A1* | 2/2019 | Chhabra | G06F 21/53 |
| 2019/0050581 | A1* | 2/2019 | Chhabra | H04L 9/0897 |
| 2020/0409734 | A1* | 12/2020 | Sahita | G06F 9/455 |
| 2022/0121447 | A1* | 4/2022 | Basak | G06F 9/3834 |

OTHER PUBLICATIONS

Extended European Search Report for European Patent Application No. 19203470.0 dated Feb. 10, 2020, 8 pages.

* cited by examiner

| | |
|---|---|
| KeyID = $K_{MK}+K_{TD}-1$ | |
| ... | $K_{TD}$ TDX keys |
| KeyID = $K_{MK}+1$ | |
| KeyID = $K_{MK}$ | |
| KeyID = $K_{MK}-1$ | |
| KeyID = $K_{MK}-2$ | $K_{MK}$ MKTME keys |
| ... | |
| KeyID = 0 | |

$K = K_{MK} + K_{TD}$
total number of keys

FIG. 2A

M=7 bits
M-L=2   L=5
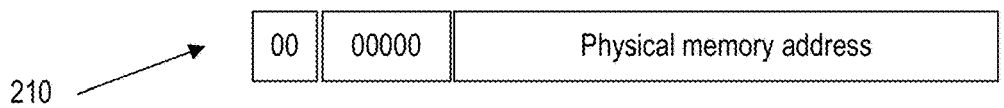
MKTME KeyID =0 (TME Key)
MKTME KeyID =22
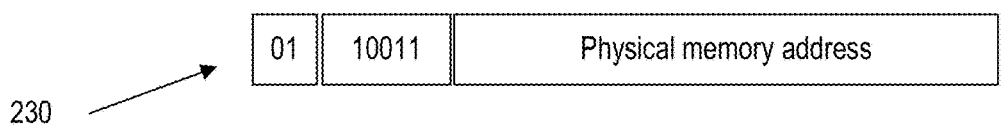
TDX KeyID=51
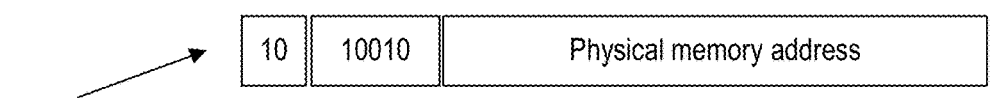
TDX KeyID=82
FIG. 2B Key Encryption Table

| KeyID | Key |
|---|---|
| 0 | 128-bit (TME) |
| 1 | 128-bit (MKTME) |
| ... | ... |
| 31 | 128-bit (MKTME) |
| 32 | 128-bit (TDX) |
| 33 | 128-bit (TDX) |
| 34 | 128-bit (TDX) |
| ... | ... |
| 126 | 128-bit (TDX) |
| 127 | 128-bit (TDX) |

FIG. 2C

Key Ownership Table

| KeyID | Ownership Status |
|---|---|
| 0 | Hypervisor root |
| 1 | Hypervisor |
| ... | ... |
| 31 | Hypervisor |
| 32 | TD 1 |
| 33 | TD 2 |
| 34 | TD 1 |
| ... | ... |
| 126 | TD 3 |
| 127 | Unassigned |

Store a first value for a first number of address bits of physical memory addresses, used for key IDs associated with encryption keys
510

↓

Store, a partition identifier (e.g., partition key ID) to partition key IDs into non-restricted key IDs and restricted key IDs
520

↓

Execute a hypervisor
530

↓

Allocate the non-restricted key IDs to the hypervisor
540

↓

Allocate to a first trust domain of a trust domain infrastructure, a first key ID, wherein the first key ID is one of the restricted key IDs
550

↓

Allocate a first physical page of a memory to the first trust domain, wherein data in the first physical page of the memory is to be encrypted with an encryption key associated with the first key ID
560

FIG. 5

CO-EXISTENCE OF TRUST DOMAIN ARCHITECTURE WITH MULTI-KEY TOTAL MEMORY ENCRYPTION TECHNOLOGY IN SERVERS

TECHNICAL FIELD

The disclosure pertains to computer systems; more specifically, to ensuring co-existence of trust domain architecture with multi-key total memory encryption technology in servers.

BACKGROUND

Modern processing devices employ disk encryption to protect data at rest. However, data in memory is in plaintext and vulnerable to attacks. Attackers can use a variety of techniques including software and hardware-based bus scanning, memory scanning, hardware probing, and the like to retrieve data from memory. This data from memory could include sensitive data for example, privacy-sensitive data, IP-sensitive data, and also keys used for file encryption or communication. The exposure of data is further exacerbated with the current trend of moving data and enterprise workloads into the cloud utilizing virtualization-based hosting services provided by cloud service providers.

BRIEF DESCRIPTION OF THE DRAWINGS

FIG. 2A is a diagram illustrating encryption key identifier (ID) space partitioning into TD and MK-TME key IDs, according to one implementation.

FIG. 2B is a diagram illustrating encryption key ID encoding and partitioning into TDX and MK-TME key IDs using M bits of address space concatenated to the physical memory address, according to one implementation.

FIG. 2C is an illustration of a micro-architectural key encryption table indexed by key ID and storing associations of key IDs to encryption keys, according to one implementation.

FIG. 2D is an illustration of a micro-architectural key ownership table indexed by key ID and storing allocations of key IDs to various trust domains, according to one implementation.

FIG. 5 is a flow diagram of an example method to enable coexistence of TD architecture and MK-TME technology, according to one implementation.

DETAILED DESCRIPTION

Figure 1A:
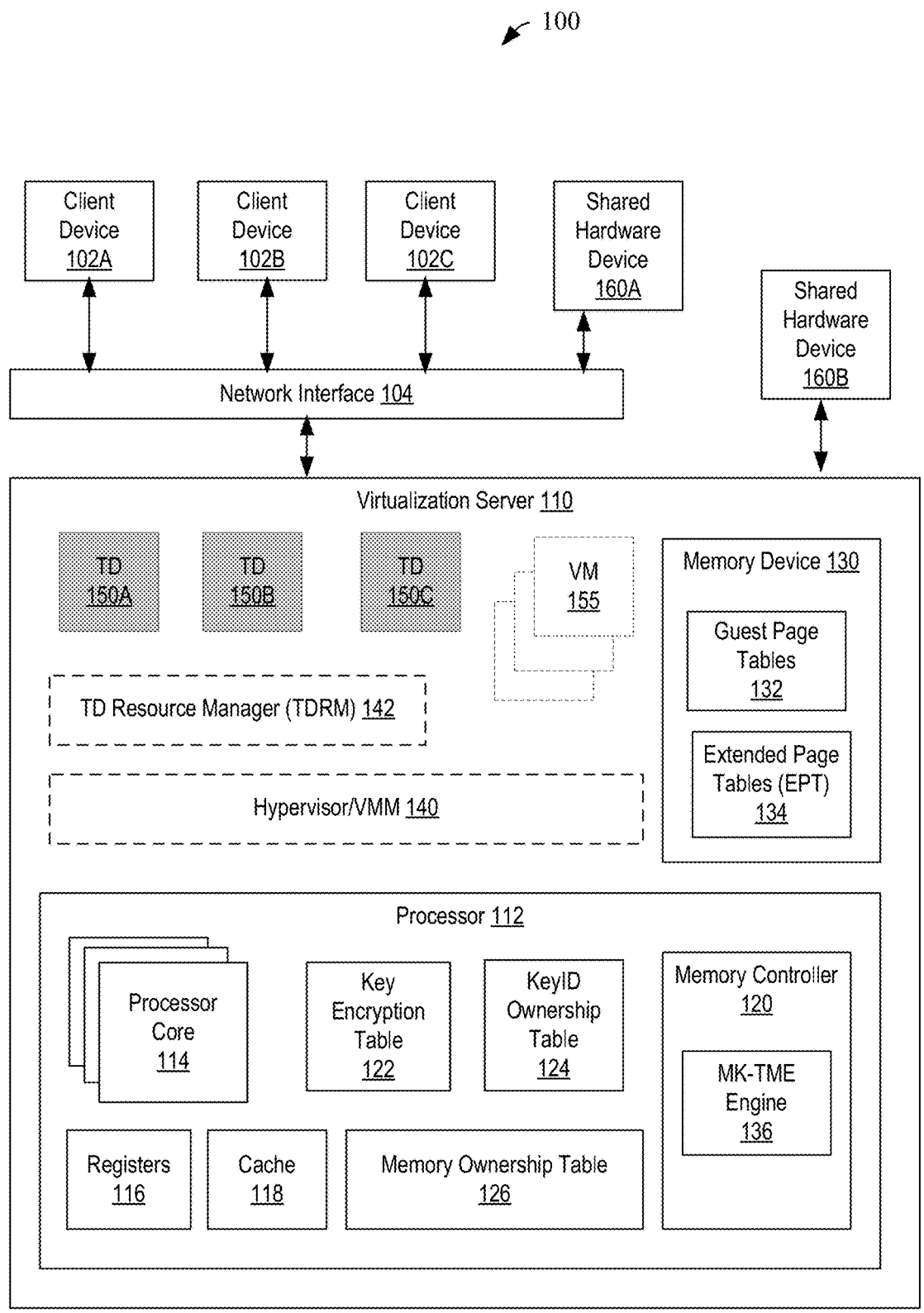
FIG. 1A is a block diagram illustrating an example computing system that enables coexistence of trust domain (TD) architecture with multi-key, total memory encryption (MK-TME) technology in virtualized systems, according to one implementation.

Aspects of the present disclosure are directed at enabling, at a hardware level, a coexistence of trust domain (TD) infrastructure with multi-key total memory encryption (MK-TME) technology. MK-TME technology refers to providing a capability to an operating system (or a hypervisor, in a virtual computing environment) to use different encryption keys to encrypt pages of physical memory associated with different clients/applications. A TD infrastructure refers to allowing clients/applications to execute within highly secured environments of TDs where even the operating system (or the hypervisor) may not have access to physical memory pages associated with TDs.

A conventional cloud server computing and virtual computing environments provide remote computing resources and remote data storage resources for various devices. Remote computing and data storage make it especially important to protect data from access by unauthorized persons and malicious software. Unencrypted plaintext data residing in memory, as well as data moving between the memory and a processor, may be vulnerable to scanning attacks. Attackers can use a variety of techniques including bus scanning, memory scanning, and the like to retrieve data from memory. Such data could even include keys used for encryption. Correspondingly, even data encrypted with an encryption key is not safe if there is a possibility that the attackers or unauthorized software may come into possession of such a key.

One way to protect data in memory is with the Total Memory Encryption (TME) technology, in which memory accesses by software executing on a processor core may be encrypted with an encryption key. For example, the encryption key may be a 128-bit key generated by the processor at a boot time and used to encrypt data sent on the external memory buses. In particular, when the processor makes a write request to memory, the data may be encrypted by a memory encryption engine before being sent to memory, where it is stored in an encrypted form. When the data is read from memory, the data is sent to the processor in encrypted form. Once the data has reached the processor, it is decrypted with the encryption key. Because data remains in the processor in the form of plaintext, the TME technology does not require modification to the existing software and how the existing software interacts with the processor.

The Multi-key TME (MK-TME) technology is an extension of TME technology that provides support for multiple encryptions keys, allowing for compartmentalized memory encryption. For example, the processor architecture may allow generating multiple encryption keys upon boot to be used to encrypt different memory pages with different MK-TME keys. The multi-key extension is particularly suited to work with multi-domain architectures, such as used by CSPs, because the number of supported keys may be implementation-dependent. The processor may utilize an MK-TME engine to cause different pages to be encrypted using different MK-TME keys.

In some implementations, CSPs have a choice to designate pages of a virtual machine (VM) to be encrypted using the same VM-specific key. In other instances, a CSP may choose specific VM pages to remain in plaintext or to be encrypted using different ephemeral keys that may be opaque to software. The MK-TME engine may support at least one key per domain and thus achieve the cryptographic isolation between different workloads present on a CSP. A workload may be associated with a tenant or owner, e.g., an entity that leases usage of the host server from the CSP.

In the TD extensions (TDX) architecture, there can be multiple secure TDs corresponding to different client machines (e.g. virtual machines), guest operating systems, host operating system, hypervisor, or the like. Additionally, even different applications run by the same client within the same guest operating system may be executed securely. To ensure scalability of the secure computing when multiple TDs are present, each TD may use one or more private keys that are not available to software operating outside the TD. In some instances, software executing in one secure domain may have access to private keys specific to that particular domain and to shared keys that may be used by multiple domains. For example, a software running inside a secure domain can use a private key for its secure execution, such as read, write, or run operations. On the other hand, the same software can use a shared key to access structures or devices that are shared with other domains, such as a printer, a keyboard, a mouse, a monitor, a network adapter, a router, and the like.

A TD may be secured even from privileged users, such as the operating system OS (either host or guest), virtual machine monitor (hypervisor), basic input/output system (BIOS) firmware, system management mode, and the like. Correspondingly, even if malicious software takes over a privileged domain, such as the operating system, sensitive data stored in memory by the TD remains protected. Such data may include medical records, biometric factors, personal ID information, intellectual property, passwords, encryption keys, or other sensitive data.

Each TD may operate independently of other TDs and use logical processor(s), memory, and I/O assigned by a Trust Domain Resource Manager (TDRM) operating as part of the host OS, the hypervisor, or as a separate software program. Each TD may be cryptographically isolated in memory using at least one exclusive encryption key of the MK-TME engine for encrypting the memory (holding code and/or data) associated with the TD.

A CSP host server running virtualization architecture may need to run both the MK-TME technology and the TDX architecture for efficient execution of client/tenant applications. For example, the host server may execute highly sensitive applications within TDs so that the hypervisor executing VMs does not have access to the memory pages and encryption keys allocated to a TD and its trusted computing base (TCB). At the same time, the host server may run applications that demand less security and isolation using the MK-TME technology where the hypervisor retains control over memory pages and encryption keys used in these less sensitive applications. The hypervisor may then isolate different applications from each other using different MK-TME keys, but still remain in the TCB of each application.

Aspects of the present disclosure, in various implementations, address the need to enable coexistence of the MK-TME technology and the TDX architecture. In some implementations, the disclosed computing system may ensure that key IDs allocated to TDs cannot be used by MK-TME software, such as the hypervisor or VMs running outside the TCB of the TD. In related implementations, the disclosed architectures may ensure that no key ID that is designated as a restricted key ID for the TD may be used concurrently by two active TDs. It may also be desirable, for additional safety of data stored in TDs, that key IDs of extinct TDs may be reallocated to other TDs after all cache data associated with the extinct TD is flushed.

Moreover, even within a highly-secure TD, a client may need to communicate with shared structures, e.g., shared hardware devices. For example, input-output (I/O) devices, printers, network adapters, routers, or other processing devices, and the like, may be used by multiple TDs and by the hypervisor running VMs using the MK-TME protections. In implementations, the access to such shared structures may still need to be secured (from other applications or external malicious attacks) by encrypting memory transactions related to operations of the shared structures. Accordingly, a TD may need to be able to use different encryptions keys—at least one restricted key for its secure operations and access to the TD's private memory pages and at least one non-restricted key for the TD's communications with the shared structures. Software operating in a trusted computing base of a TD may attempt to use a non-restricted key for memory transactions involving private memory pages. For example, trusted software may attempt to write data into a private memory page using a non-restricted key. In the absence of a hardware protection disclosed in the instant specification, such data may be vulnerable to a software access (e.g. a read operation) from a program outside the TCB that may gain access to the shared non-restricted key.

FIG. 1A illustrates an example computing system 100 that enables coexistence of TDX and MKTME technologies on a virtualization server 110 supporting multiple client devices 102A, 102B, and 102C. The computing system 100 may further include a network interface 104 and shared hardware devices 160A and 160B. The virtualization server 110 may include, but not be limited to, a processor 112, memory device 130, and one or more TDs 150A, 150B, and 150C.

The processor 112 may execute a virtual machine monitor (VMM) or hypervisor 140, a TD Resource Manager (TDRM) 142, which in turn may run one or more virtual machines (VMs) 155. In various implementations, the processor 112 may include one or more processor cores 114, one or more registers 116 (e.g., hardware registers), cache 118, a memory controller 120, a key encryption table (KET) 122, a key ownership table (KOT) 124, and a memory ownership table (MOT) 126. The memory controller 120 may further include a memory encryption engine such as a MK-TME engine 136. The memory device 130 may include dynamic random access memory (DRAM), synchronous DRAM (SDRAM), a static memory, such as static random access memory (SRAM), a flash memory, a data storage device, or other types of memory devices. For brevity, the memory device 130 will henceforth be referred to as memory 130.

Each client device may be a remote desktop computer, a tablet, a smartphone, another server, a thin/lean client, and the like. Each client device may execute applications on the virtualization server 110 in one or more of the TDs 150A, 150B, and 150C and one or more VMs 155, where the VMs run outside the TCB of each respective TD. A hypervisor 140 may execute a virtual machine environment where the hypervisor leverages hardware capabilities of a host and is to execute one or more guest operating systems, which support client applications that are run from separate client devices 102A, 102B, and 102C. A single TD, such as the TD 150A, may provide secure execution environment to a single client 102A and support a single guest OS, in one implementation. In another implementation, one TD may support multiple tenants each running a separate virtual machine and facilitated by a tenant virtual machine monitor (tenant VMM) running inside the TD. The tenant VMM (not explicitly illustrated in FIG. 1) may be communicating with the hypervisor (host VMM) 140 to access the memory 130 and the processor 112. The execution state of the TDs 150A-C may be further enabled by the TDRM 142. The TDRM 142 may be an extension of the hypervisor 140 or as a separate resource that is supported by the hypervisor 140.

The TDRM 142 and hypervisor 140 may act as a host for TDs and control access of TDs to the processor 112 and other system hardware. The processor 112 may have one or multiple processor cores 114, hardware registers 116, and cache 118. The processor 112 may further have a memory controller (memory-management unit) 120 to control memory operation. The memory controller may have a memory encryption engine, such as a MK-TME engine 136 to encrypt/decrypt memory operations with appropriate encryption keys. The processor 112 may have the capability to enter a TDX mode where TDX instructions are loaded into hardware registers 116 (such as control registers or model-specific registers) of the processor 112 to facilitate isolation of memory from any software that does not belong to the TCB of the TD. The TDRM may possess the capability to enter and exit the TDX mode.

The TDRM 142 may act as a host and have control of the processor and other platform hardware. A TDRM 142 may assign software in a TD (e.g. TD 150A) with logical processor(s), but may not access a TD's execution state on the assigned logical processor(s). Similarly, the TDRM 142 may assign physical memory and I/O resources to a TD but not be privy to access/spoof the memory state of a TD due to separate encryption keys, and other integrity/replay controls on memory.

A TD represents a software environment that may support a software stack that includes VMMs, guest operating systems, and various application software hosted by the guest OS(s). Each TD may operate independently of other TDs and use logical processor(s), memory, and I/O assigned by the TDRM. Software executing in a TD may operate with reduced privileges so that the TDRM may retain control of the platform resources. On the other hand, TDRM cannot access data associated with a TD or in some other way affect the confidentiality or integrity of a TD.

The TDRM 142 (or a hypervisor portion of the TDRM) may perform management of the encryption keys. For example, the TDRM may assign different keys to different TDs, configure keys on the memory encryption engines, call for the execution of cache flush when keys are to be reassigned to different TDs, and the like. In implementations of the disclosure, the TDRM 142 in the TD architecture acts as a host for the TDs and has full control of the cores and other platform hardware. A TDRM 142 assigns software in a TD with logical processor(s). The TDRM 142, however, may not have access to a TD's execution state on the assigned logical processor(s). Similarly, a TDRM 142 assigns physical memory and I/O resources to the TDs, but may not be privy to access the memory state of a TD due to the use of separate encryption keys enforced by the processor per TD, and other integrity and replay controls on memory. Software executing in a TD operates with reduced privileges so that the TDRM 142 may retain control of platform resources. However the TDRM 142 may not be allowed to compromise the confidentiality or integrity of the TD by gaining access to the TD's trusted computing base.

To further improve security of data in TDs, the TDX architecture may employ K encryption keys that are securely generated. In one implementation, the TDRM 142 may cause the processor 112 (for example, using instruction TDCREATE, as detailed below) to generate an ephemeral memory encryption key and a corresponding key identifier (ID) for each TD. The encryption keys (e.g., K encryption keys) may be identified to software running on the processor by unique (key IDs. In one implementation, a key ID for a TD may be appended to the physical memory addresses associated with that TD. The BIOS (or other startup firmware), during start up, may allocate a range of bits within the physical memory addresses for a particular number of key IDs. For example, the BIOS may store a range of bits in the hardware register 116, such as a model-specific register (MSR) in one implementation. After boot, the computing system 100 may retrieve the range of bits from the MSR and employ those bits to encode the key IDs within the physical memory addresses.

In various implementations, each key ID could be any number having a binary representation. For example, a range of K consecutive numbers, beginning from 0 and ending with K−1, may be used in one implementation. In another implementation, the range of the numbers used for representations of encryption key IDs may start from a different number. The range need not be contiguous in some implementations. A binary encoding of the encryption key IDs may include M bits wherein M may be an integer such that $M \geq \log_2 K$, to ensure that the total number $2^M$ of various combinations of M bits is not less than the number K of different encryption keys.

Physical pages of the memory 130 may be encrypted with one of the encryption keys. As discussed, the key ID corresponding to the encryption key used for memory encryption may be added to the physical memory address of the physical page of the memory, e.g., physical memory of the host server, which will be explained in more detail below. With the key IDs appended to the physical memory addresses, a memory transaction requested by software may fail unless the memory transaction request includes both the physical memory address of the page and the correct key ID for the encryption key used to encrypt/decrypt the physical page of the memory. The memory transaction may be a "read," "write," or "execute" operation involving the physical page of the memory.

The concatenation of the restricted key ID to the physical memory addresses of the physical memory allocated to the TD for private use may prevent unauthorized or unsecured accesses to such memory. In order to maintain hardware isolation of restricted encryption keys from non-restricted encryption keys, the processor 112 may need to enable partition of key IDs into restricted TD key IDs (e.g., allocated to TDX) and non-restricted MK-TME key IDs (e.g., allocated to the hypervisor, TDRM, OS, or other software outside the TCB of TDs) and maintain this partition during the execution of the TDX architecture in one or more micro-architectural tables stored inside the processor. In some implementations, boot up software or firmware (e.g., BIOS) may set up such a partition and store an identification of the partition in the hardware register 116 of the processor 112 that may be software accessible after boot of the computing system 100. This allows the system to run both the TD architecture and the MK-TME technology within the host server to enable highly secure virtual machines running inside TDs as well as unmodified VMs protected by the MK-TME mechanisms.

To maintain isolation from software (such as the hypervisor 140), the partition of key IDs into restricted and non-restricted may be static, in one implementation. If, during post-boot execution, it is determined that a different partition of key IDs may be optimal, a post-boot software (e.g., the hypervisor 140) may request key ID repartitioning. This may be advantageous, for example, if the number of applications requiring highly-secure execution has increased. In some implementations, this may be done by the post-boot software initiating a handshake mechanism with the boot-up firmware/software requesting modification of the key ID partition. Upon completion of the handshaking and determining the new desired partition of key ID space, the TDRM 142 may save a state of execution of TDs currently running on the processor using the key IDs and perform a system reboot. This may provide flexibility to define partition of key IDs between MK-TME and TDX based on the workload and the current state of the computing system.

The hypervisor 140 may assign logical processors, physical memory, encryption key IDs, I/O devices, and the like to TDs, but may not access the execution state of TDs and/or data stored in physical memory assigned to TDs. The processor 112 may utilize the MK-TME engine 136 to use restricted encryption keys to facilitate secure data storage and handling. For example, the MK-TME engine 136 may encrypt data before moving it from one or more registers 116 or cache 118 to the memory 130 upon performing a "write" code. Conversely, the MK-TME engine may decrypt data when the data is moved from the memory 130 to the processor 112 following a "read" or "execute" command.

Each processor core 114 of the processor 112 may support one or more hardware threads corresponding to logical processors. The logical processors supported by the processor cores 114 may be assigned to the TDs 150A-C by the TDRM 142 in some implementations. In addition to the TDX-based implementation of client virtual machines, the virtualization server 110 may execute one or more VMs 155 outside TDs for one or more client devices 102A-C.

Whereas software outside trust computing base of the TDs—such as the TDRM 142 and hypervisor 140—may not have access to physical memory pages allocated to TDs and/or execution state of TDs, the virtual machines operating outside TDs may not be secure against accesses by the hypervisor 140 in one implementation. Nonetheless, the virtual machines operating outside the TCB of each TD may still be secure from software accesses originating from TDs or other virtual machines. In some implementations, such access may prevented by the MK-TME engine 136 encrypting data moving between the processor 112 and the memory 130 with one or more non-restricted encryption keys using the MK-TME engine 136. The term "non-restricted" is meant to refer to a key accessible to the hypervisor 140. On the other hand, the unauthorized TDs and VMs may be prohibited from using such keys for memory transactions, in some implementations.

Additionally, in at least some implementations, one or more of the non-restricted keys may be shared. Shared keys may be accessible by two or more entities, such as TDs and VMs running outside the TDX environment. Shared keys may be used to access one or more shared structures, such as shared hardware devices 160A and 160B, which may be a printer, a keyboard, a mouse, a monitor, a network adapter, a router, and the like. For example, to print an image or a text page, a software operating in a TD 150A may need to encrypt data with a shared key and store the encrypted data in memory 130 before transmitting the data to a shared hardware device. A shared hardware device 160A may be connected to the virtualization server 110 via a network interface 104, in one implementation. In another implementation, a shared hardware device may be local to the virtualization server 110, as illustrated, for example by the shared hardware device 160B.

The memory controller 120 to control data exchanges between the processor core(s) 114, registers 116, cache 118 and memory 130. In some implementations, the memory controller 120 may be coupled to the (KET 122 used to store encryption keys and key IDs of the encryption keys and to the KOT 124 used to store allocations of the key IDs to TDs. The memory controller 120 may also be coupled to the VMs, which run outside the TDX architecture, and to the MOT 126 used to store attributes of physical memory pages, such as allocations of physical memory pages to the TDs and VMs. The memory controller 120 may include the MK-TME engine 136 to enable existence of multiple encryption keys used to encrypt/decrypt data being moved to/from the memory 130.

To enable virtual memory implementations, the memory 130 may store guest page tables 132 and extended page tables (EPT) 134, which are set up by VMs for use by the hypervisor 140. For example, a tenant software (e.g. guest OS) may reference a linear address, such as a guest virtual address (GVA), when executing a memory transaction. In response, the processor 112 may execute a page walk in the guest page tables 132 to identify a guest physical address (GPA) associated with the referenced linear address. The GPA may still be a virtual address for a host server, such as the virtualization server 110. To identify the host physical memory address (HPA) for the determined GPA, the processor 112 may execute another page walk in the EPT 134. The data stored in the physical memory page referenced in the determined HPA may then be decrypted using the key ID used to encrypt the particular memory page associated with the determined HPA. In one implementation, the key ID associations with the HPAs are stored in the MOT 126.

Figure 1B:
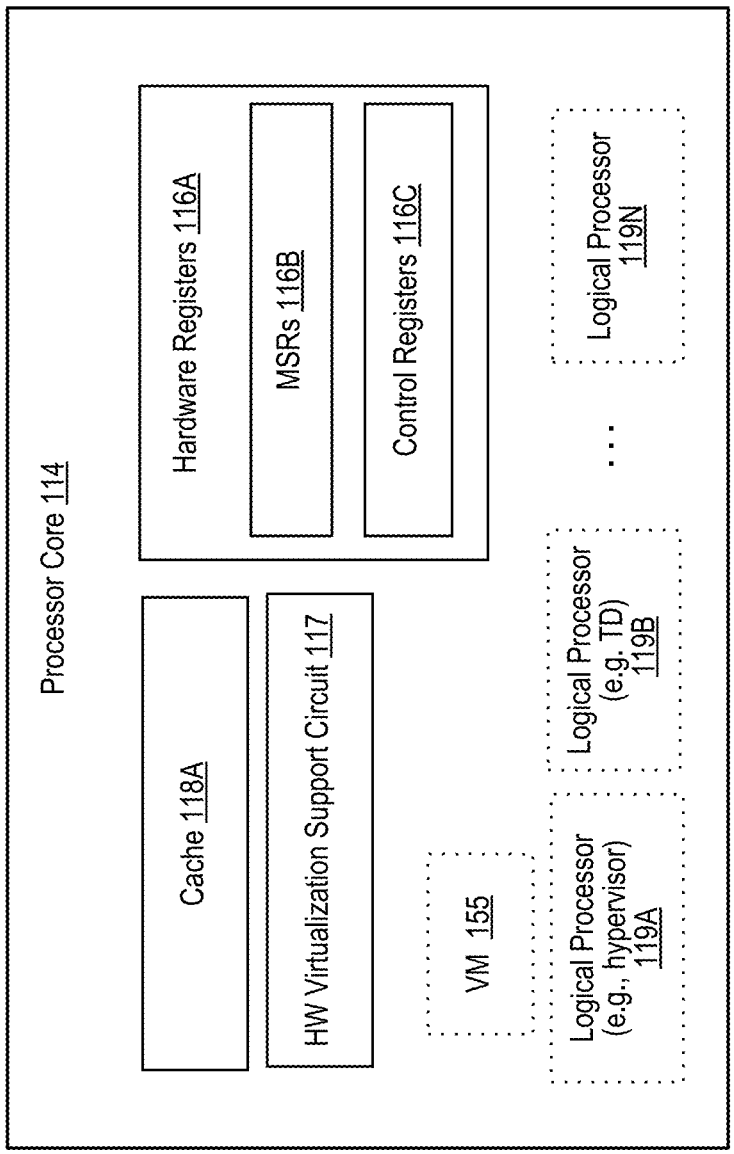
FIG. 1B is block diagram illustrating an example processor core of a processor of the computing system that enables coexistence of TD architecture with MK-TME technology, according to one implementation.

FIG. 1B is block diagram illustrating an example processor core of a processor of a computing system that enables coexistence of TD architecture with MK-TME technology, according to one implementation. In the implementation illustrated in FIG. 1B, each processor core 114 may include cache 118A, a hardware virtualization support circuit 117, and hardware registers 116A. The hardware registers 116A may include, for example, a number of model-specific registers 116B (or MSRs) and control registers 116C (e.g., CR1, CR2, CR3, and the like). In implementations, when the cache 118 and the hardware registers 116 are referred to herein, the implementations may be understood to additionally or alternatively include the cache 118A and the hardware registers 116A of one or more of the processor cores 114.

The processor core 114 may execute instructions to run a number of hardware threads, also known as logical processors, including the first logical processor 119A, a second logical processor 119B, and so forth, until an Nth logical processor 119N. In one implementation, the first logical processor 119A is a hypervisor 140. A number of VMs 155 may be executed and controlled by the hypervisor 140. Additionally, the hypervisor 140 may assign key IDs, which are associated with corresponding encryption keys, to various TDs operating on the computing system 100.

Figure 1C:
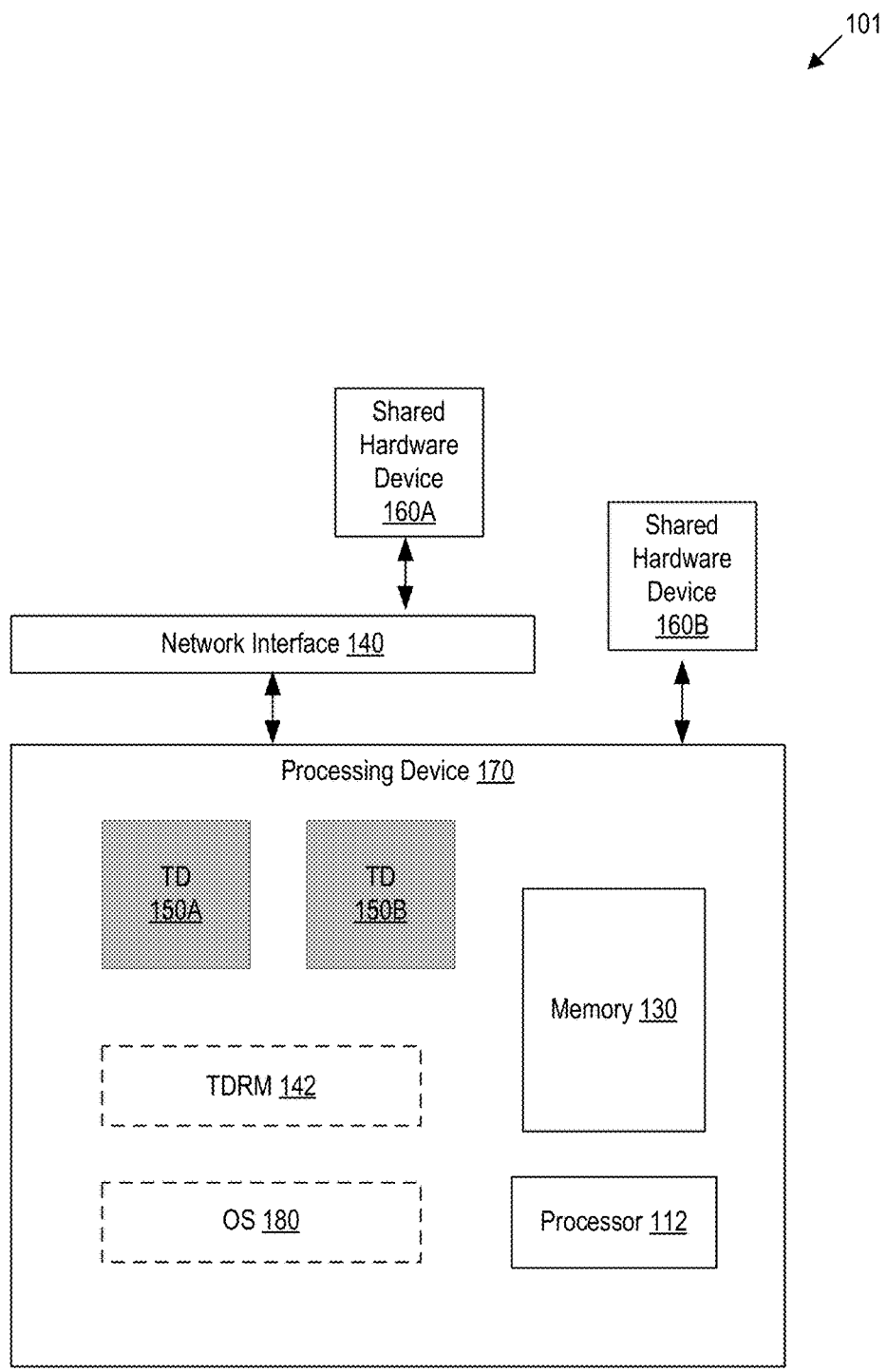
FIG. 1C is a block diagram illustrating an example computing system that enables coexistence of TD architecture with MK-TME technology in a computing system without virtualization, according to another implementation.

FIG. 1C is a block diagram that illustrates an example computing system 101 that enables coexistence of TD architecture with MK-TME technology in a computing system 101 without virtualization running directly on the operating system 180 of the processing device 170, according to various implementations. A TD 150 may be executed together with the MK-TME engine 136 to remove the OS 180 from the TCB of the TD 150A. The hypervisor 140 (of the implementation of FIG. 1A) or the OS (of the implementation of FIG. 2B) 180 may assign multiple encryption keys to the TD 150A, including: one or more restricted keys for secure access to TD's private memory pages and one or more non-restricted keys for access to the shared hardware devices 160A-B (FIG. 1A), which may be shared with other processing devices.

In one implementation, the processing device 170 may be a personal computer or another processing device that does not use cloud computing. The demands of secure execution of various applications on the processing device 170 may nonetheless make it advantageous to execute multiple TDs to prevent access of applications running inside TD 150A to the secure data in the memory pages assigned to TD 150B. For example, the processing device may be a record-keeping computer in a medical office or a clinic. An application running inside TD 150A may store patients' health history while another application executing inside TD 150B may store their personal data. The medical office or clinic may wish to protect the personal data even if some malicious software gains access to encryption keys assigned to TD 150A and accesses patients' health history. Accordingly, the hypervisor 140 or OS 180 may allocate one or more restricted encryption keys to TD 150B that are different from the restricted encryption keys allocated to TD 150A. The hypervisor 140 or OS 180 may retain control of other—non-restricted—keys for other applications running outside TDs 150A and 150B. The hypervisor 140 may not allow access to such non-restricted keys to TDs 150A and 150B for security reasons. In some implementations, the hypervisor 140 may share some of its non-restricted keys with TD 150A and/or TD 150B for memory transactions associated with the access to shared hardware devices 160A and/or 160B, which could be a printer, an I/O device, a monitor, a network adapter, and the like. Some of these devices—e.g., a hardware device 160A—may be connected to the processing device 170 via the network interface 104.

In various implementations, the trust domain infrastructure may be implemented using the appropriate instruction set architecture of the processor 112, such as the trust domain extensions (TDX) implementation. In one implementation, a TD 150A may be created and launched by the TDRM 142 which may provide a programming interface to manage the operation of TDs. The TDRM 142 may create a TD 150A using a TD create instruction, e.g., TDCREATE. The TDRM 142 may select a region of physical memory (e.g., an aligned 4 KB region) and provide this as a parameter to the TD create instruction. This region of memory may be used as a TD control structure (TDCS) for the TD 150A. In some implementations, the TDCS occupies a 4 KB naturally aligned region of memory. A page identified as a TDCS for the TD 150A in the MOT may be blocked against software read and write operations, and in this way protected for use within the TDX architecture. The TDCS, for example, may hold a TD identifier, an encryption key allocated to the TD, and the key ID associated with the encryption key. When executed, the TDCREATE instruction may cause the processor 112 to verify that the destination 4 KB page is assigned to the TD (using the MOT 126). The TDCREATE instruction may further cause the processor 112 to generate an encryption key and associated key ID for the TD 150A. The processor 112 may then initialize the page contents on the destination page using the encryption key assigned to the TD. The TDCREATE instruction may also cause the processor 112 to initialize a hash for a TD measurement to be stored in the TDCS.

In one implementation, the TDRM 142 may set up the initial block code and data for the TD 150A using a TDADDPAGE instruction that specifies the address of the TDCS page as a parameter, an address of a code (or data) page for the TD image in TDRM address space, and the physical page assigned to the TD 150A. The processor 112 may then verify that the destination 4 KB page is assigned to the TD 150A. Once verified, the processor 112 extends the hash for the TD 150A in the TDCS. Then, the processor copies the page contents from source to destination page using the unique encryption key assigned to the TD 150A. A similar procedure may be followed to instantiate other TDs 150B-C, as many as needed and supported by the processor 112 and memory 130.

The encryption keys and key IDs associated with the encryption keys may be enabled by the MK-TME engine 136 configured by BIOS, upon boot of the computing system 100, or by the processing device 170, using a TME activate (TME_ACTIVATE) MSR within the hardware registers 116 (e.g., MSRs). To enable MKTME, TME Enable RWL bit in the TME_ACTIVATE MSR may be set and bits 35:32 may be set to non-zero values (which specify the number of Key ID bits configured for MK-TME). These MK_TME_KEYID_BITS are the number of key ID bits to allocate to MK-TME usage. Similar to enumeration, this is an encoded value. Writing a value greater than the enumerated number of maximum supported KeyID bits may result in general protection fault (# GP). Writing a non-zero value to this field may also result in a general protection fault if bit 1 of EAX (TME Enable) is not also set to '1,' as TME is to be enabled to use MK-TME. The TME_ACTIVATE MSR may also be used to lock other TME-related MSRs (e.g., EXCLUD_MASK, EXCLUDE_BASE), so that any write to the registers after they are locked will be ignored. The lock may be reset when the computing system 100 is reset.

In some implementations, when the computing system 100 is booted, the BIOS may store particular information in the TME_ACTIVATE MSR for later use by the processor 112 (e.g., the memory controller 120) in restricting access to the restricted encryption keys and key IDs. This information may include a value for a number of address bits of physical memory addresses (e.g., host physical addresses) used for key IDs. The particular information stored by BIOS into the TME_ACTIVATE MSR may further include a partition identifier (e.g., a partition key ID) to partition key IDs into non-restricted key IDs and restricted key IDs. Furthermore, in one implementation, a second number of restricted bits of the physical memory addresses may be stored in the TME_ACTIVATE MSR that specifies how the restricted key IDs are partitioned from the non-restricted key IDs.

FIG. 2A illustrates encryption key ID space partitioning 200 into TDX and MK-TME key IDs, in one implementation, with a single boundary separating non-restricted key IDs from restricted key IDs. On boot, the processor 112 may store within the MSR a bit range for the key ID encoding. The bit range may support K key IDs to identify Kencryption keys. The processor 112 may further identify within the MSR the partitioning 200 of the key ID space. In one implementation, K key IDs may be partitioned into $K_{MK}$ non-restricted key IDs and $K_{TD}$ non-restricted key IDs, so that $K_{MK}+K_{TD}=K$. The non-restricted key IDs may be MK-TME key IDs allocated to the hypervisor 140 (e.g., for allocation to shared devices) in a virtualization implementation illustrated in FIG. 1A. The MK-TME key IDs may further be allocated to the operating system 180 (or the TDRM 142) in a non-virtualization implementation illustrated in FIG. 1C. The restricted key IDs may be allocated to the TD infrastructure and then further allocated to one or more TDs 150A-C.

In one implementation, key IDs may be mapped onto a contiguous interval of integer numbers ranging from 0 to K−1. The non-restricted key IDs may map onto the lower set of contiguous numbers ranging from 0 to $K_{MK}-1$, with the restricted key IDs mapping onto the higher set of contiguous number ranging from $K_{MK}$ to K−1. In the implementation illustrated in FIG. 2A, one boundary between restricted and non-restricted key IDs is defined, e.g., residing below the key ID=$K_{MK}$ line. While partitioning the key ID space into two contiguous ranges may be advantageous in some instances, in other implementations multiple boundaries may be defined such that multiple regions of non-restricted key IDs are interspaced with regions of restricted key IDs.

FIG. 2B illustrates one possible encryption key ID encoding and partitioning 205 into TDX and MK-TME key IDs using M bits of address space concatenated to the physical memory address. In one implementation, a value M represents the number of address bits concatenated (or appended) to the physical memory address 210 of a physical memory page. The physical memory page may be a 4 KB page, in some implementations, and may be allocated to one of the TDs 150A-C to be encrypted with one of the restricted encryption keys. (In other implementations, other page sizes may be supported by a hierarchical structure, like a page table.) Alternatively, the physical memory page may be allocated to the hypervisor 140 to be encrypted with one of the non-restricted keys for non-shared use by hypervisor or by one of the applications enabled by hypervisor, including VMs 155 executed outside the TDX architecture. Alternatively, the physical memory page may be encrypted with one of the non-restricted keys allocated to the hypervisor 140 and further allocated by the hypervisor to multiple TDs for memory transactions associated with use of shared structures, such as the shared hardware devices 160A-B.

To be sufficient to encode K key IDs, the number of address bits M must be at least equal to $\log_2 K$. In one implementation illustrated by way of example, but not limitation, M=7, and such number of address bits may support up to $2^7=128$ different key IDs. The first key (key ID=0) may be a TME key, i.e. a key allocated to the hypervisor 140 to encrypt memory transactions owned by the hypervisor. For example, the physical memory address 210 may be used to store the configuration of the hypervisor which is not to be shared with any TDs and/or VMs enabled by the hypervisor.

To facilitate partition of key IDs into restricted and non-restricted key IDs, a second value L of the number of address bits may be defined. To be sufficient to encode $K_{MK}$ non-restricted key IDs, L is at least equal to $\log_2 K_{MK}$. For example, to encode $K_{MK}=20$ non-restricted key IDs, L must be at least 5. Note that the same value L=5 would be sufficient to encode up to 32 non-restricted key IDs.

The lower L bits of the M address bits may be referred to as a bit sub-range of non-restricted bits (or general bits), the remaining upper M−L bits may be referred to as a sub-range of restricted bits. In one implementation, the address bits have the same value 0 for all non-restricted key ID encodings. For example, a physical memory address 220 refers to a page of physical memory that is encrypted with an encryption key associated with a key ID equal to 22. Because the first (restricted) M−L bits have the same value 0, key ID is a non-restricted MK-TME key ID allocated to the hypervisor.

In the same implementation, if any of the M−L restricted bits is set (i.e. have value of one ("1")), the key ID is restricted and allocated to one of the TDs of the trust domain infrastructure. For example, a physical memory address 230 refers to a page of physical memory that is encrypted with an encryption key associated with a key ID equal to 51. In one implementation, this key ID may be used by TD 150A. As another example, a physical memory address 240 refers to a page of physical memory that is encrypted with an encryption key associated with a key ID equal to 82. In one implementation, this key ID may be used by TD 150B.

Notice that whereas L general (non-restricted) bits are used to encode non-restricted key IDs, with M−L restricted bits clear (i.e. having value of zero ("0")), both the general bits and the restricted bits are used to encode restricted key IDs, in one implementation. The total number of restricted key IDs supported by the partition illustrated in FIG. 2B is $2^7-2^5=96$.

In some implementations, to encode non-restricted key IDs, the upper general bits have the value of one ("1") rather than the value of zero ("0"). In such implementations, the lower $2^M-2^L$ key IDs are restricted key IDs whereas the upper $2^L$ key IDs are non-restricted.

In the partition illustrated in FIG. 2B, the general bits are contiguous and so are the restricted bits (e.g. RRGGGGG), where the restricted bits are the M−L upper bits of the key ID encoding and the general bits are the L lower bits. In some implementations, non-contiguous general and restricted bits may be used. For example, for the same situation of L=5 general bits and M−L=2 restricted bits, the mapping of bits may be non-contiguous, e.g., RGRGGGG. Provided that non-restricted key IDs are such where all R=0, the key ID space would then look as follows:

0≤key ID≤15: non-restricted (MK-TME) key,
16≤key ID≤31: restricted (TDX) key,
32≤key ID≤47: non-restricted (MK-TME) key,
48≤key ID≤127: restricted (TDX) key.

Correspondingly, three boundaries between restricted and non-restricted key IDs would be implemented.

The number of boundaries may be even greater for other partition implementations. In one implementation, restricted keys may be interspaced with non-restricted key IDs one after another. This may happen, as a way of example, if only the lowest bit of the M bits used for key ID encoding is a restricted bit. Provided that this lowest bit is set for restricted key IDs and clear for non-restricted key IDs, every even (and $0^{th}$) key ID is a non-restricted key ID and every odd key ID is a restricted key ID. In such implementation, the number of restricted key IDs is the same as the number of non-restricted key IDs.

Figure 2E:
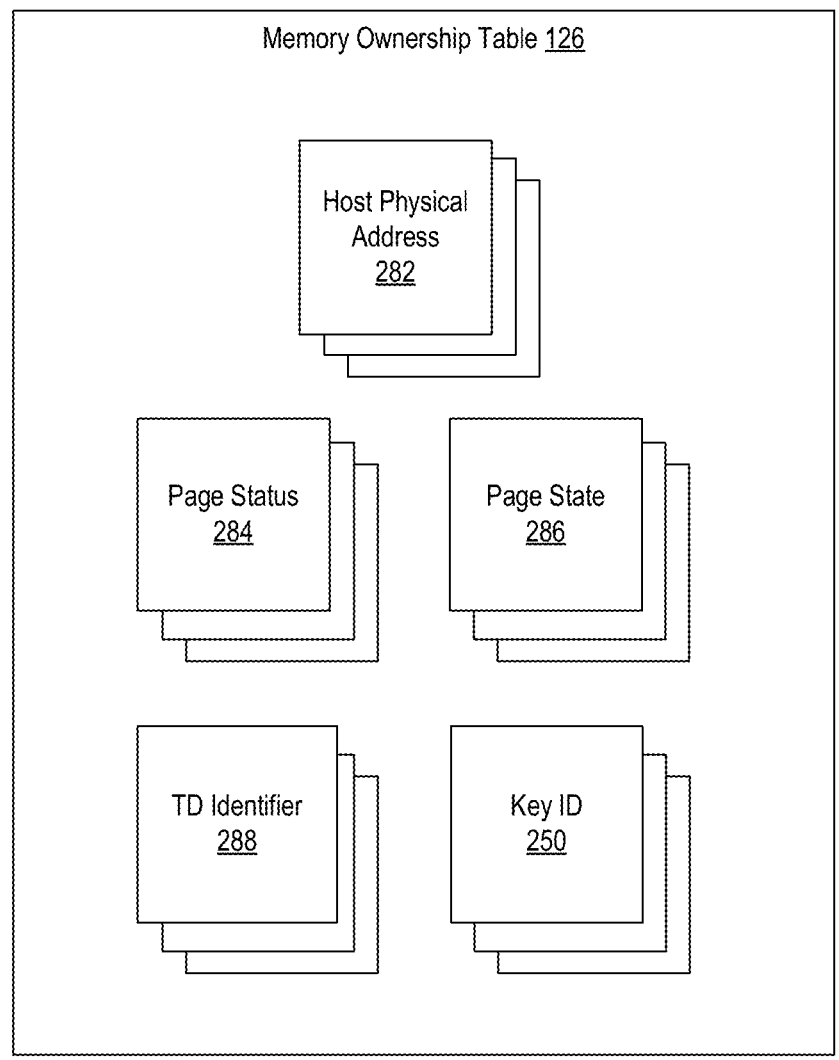
FIG. 2E is an illustration of a micro-architectural memory ownership table storing meta-data attributes for physical pages of memory, according to one implementation.

In MK-TME architecture (with or without TDX), each memory page may be encrypted with one of the encryption keys. The processor 112 may enforce encryption key usage via the memory controller 120, in one implementation. The memory controller 120 may be coupled to a number of tables illustrated in FIGS. 2C2E to enable such enforcement. For example, the memory controller may include the KET 122, which stores mappings of encryption keys to key IDs, as illustrated in FIG. 2C for one implementation where K=128 total keys and $K_{TDX}$=96 restricted keys. In one implementation, encryption keys 255 may be 128-bit keys. The KET 122 may be indexed by the key IDs 250. The partition of key IDs (and, hence, of the encryption keys) may be implemented as described above. When a memory transaction is directed at a physical memory address of a physical page of the memory, the processor may extract the key ID from the upper M bits of the physical memory address used for key ID encoding. The processor may then reference the KET 122 to determine which encryption key is to be used to decrypt or encrypt the physical page of the memory.

The KET 122 (FIG. 2C) is a micro-architectural hardware table for configuring the encryption engines, such as the MK-TME engine 136. The partition of KET 122 into TDX keys and MK-TME keys may be performed by the TDCONFIGKEY instruction.

The memory controller 120 may be coupled to the KOT 124 (FIG. 2D). The KOT 124 may store the allocations 265 of key IDs 250 to various TDs and software running outside the TCB of each respective TD, such as the hypervisor. The KOT may be indexed by key ID 250, in one implementation. For each key ID 250 the KOT 124 may store a reference to an entity to which the key ID 250 is currently assigned. For example, the first non-restricted key ID=0 may be allocated to the hypervisor 140 to encrypt the physical memory pages used in hypervisor root operations. A number of other non-restricted key IDs 250 may be further allocated to, or for use by, the hypervisor 140. The hypervisor may further allocate some of the non-restricted key IDs 250 to other applications, such as the VMs 155 running outside the TDX architecture. The KOT 124 may also store allocation of restricted key IDs to various executed TDs: TD1, TD2, TD3, and so on. More than one restricted key ID 250 may be allocated to the same TD. Some of the restricted key IDs 250 may not be assigned to any TDs but may be reserved for a later use, as needed.

The KOT 124 is a micro-architectural hardware table for managing the TDX and MK-TME inventory, in particular for assigning key IDs 250 to TDs 150A-C, revoking key IDs 250, and controlling flushing cache 118 before reassigning key IDs 250 to different TDs. The KOT 124 provides hardware protection against multiple concurrent assignments of the same TDX key IDs to different TDs.

Because the KET 122 and the KOT 124 are implemented in the hardware of the processor 112, these tables are not directly accessible by software. This allows the processor 112 to track the proper operation of the software and guarantee the TDX security objectives.

As illustrated in FIG. 2E, the memory controller 120 may be further coupled to the memory ownership table (MOT) 126 managed by the processor 112 to enforce assignment of physical memory pages to executing TDs, such as TD 150A. The processor 112 also uses the MOT 126 to enforce that the physical addresses referenced by software operating, in one implementation, where a TD 150A or the TDRM 142 cannot access memory not explicitly assigned to them.

The MOT 126 may enforce the following properties. First, software outside a TD 150A is not to access (read/write/execute) in plain-text any memory belonging to a different TD (this includes the TDRM 142 as a security domain). Second, memory pages assigned via the MOT 126 to specific TDs, such as TD 150A, may be accessible from any logical processor in the system (where the logical processor is executing the TD that the memory is assigned to), in one implementation.

The MOT 126 structure may be used to hold meta-data attributes for each 4 KB page of memory. Additional structures may be defined for additional page sizes (2 MB, 1 GB). The meta-data for each 4 KB page of memory is direct-indexed by the physical page address. In other implementations, other page sizes may be supported by a hierarchical structure (like a page table). A 4 KB page referenced in the MOT 126 may belong to one running instance of a TD 150A. 4 KB pages referenced in the MOT 126 may either be valid memory or marked as invalid.

In one implementation, the MOT 126 is aligned on a 4 KB boundary of memory and occupies a physically-contiguous region of memory protected from access by software after platform initialization. In an implementation, the MOT is a micro-architectural structure and cannot be directly accessed by software. Architecturally, the MOT 126 may hold the following attributes for each 4 KB page of host physical memory: host physical address 282 of a host physical memory page, page status 284 (indicating whether the page is a valid memory page), page state 286 (indicating whether the page is assigned, is in the process of assigning/freeing/reassigning to a TD, and so on), TD Identifier (TDID) 288 (indicating to what specific TD the page is assigned), and key ID 250 of the encryption key used to encrypt/decrypt the host physical memory page.

The MOT 126 may be enabled when TDX is enabled in the processor 112 (e.g., via CR4 enable bit, after CPUID-based enumeration). Once the MOT 126 is enabled, the MOT 126 may be used by the processor 112 to enforce memory access control for physical memory accesses initiated by software, including the TDRM 142.

In implementations, the TDRM 142 manages memory resources via the MOT 126 using a MOT operation instruction (TDMOTOP) with the following sub-instructions:

Add page to MOT (TDMOTADDPAGE) marks a free entry in the MOT 126 corresponding to a host physical address (HPA) as assigned (exclusively) to a TD 150A specified by a TDID 288. Any other prior page state may cause a fault. This instruction forces a cross-thread translation lookaside buffer (TLB) shootdown to confirm that no other TD 150B caches a mapping to this HPA. Specifically, a TLB shootdown may be understood as invalidation of a TLB entry across all the processor cores 114 of the processor 112. The TDMOTADDPAGE instruction may be invoked by the TDRM 142. If the TDRM 142 has enabled an extended MOT, then the instruction may specify the initial guest physical address (GPA) that is mapped to the specified HPA. The processor 112 verifies that the GPA is mapped to the HPA by walking the EPT 134 managed by the TDRM 142. A variant of the TDMOTADDPAGE instruction may be implemented, which assigns a page to a TD (TDMOT-AUGPAGE) but may not capture a measurement of the page.

Revoke page from MOT (TDMOTREVOKEPAGE)—marks an assigned page as a free page. This instruction forces a cross-thread TLB shootdown to confirm that subsequent TD 150A accesses check for HPA ownership, and that the page contents are cleared by the processor 112. A TD 150A access that experiences a MOT 126 page fault during TLB fill causes the processor 112 to invalidate the TDCS, which prevents further TD enter into the TD 150A. This instruction leaf may be invoked by the TDRM 142.

Block page in MOT (TDMOTBLOCKPAGE) marks a free or assigned entry of the MOT 126 corresponding to an HPA as blocked for software usage. Any other prior page state causes a TDRM 142 fault. This instruction forces a cross-thread TLB shootdown to confirm that subsequent TD 150A accesses check for HPA ownership. This instruction leaf may be invoked by the TDRM 142.

Unblock page in MOT (TDMOTUNBLOCKPAGE) Marks a blocked MOT 126 entry corresponding to an HPA as valid for software usage/assignment. Any other prior page state causes a fault. The TDMOTBLOCKPAGE instruction may be invoked by the TDRM 142.

In some implementations, and with additional focus on FIG. 2E, the memory controller 120 may allocate one or more physical pages of the memory 130 to the TD 150A for private use of software programs and applications executing inside the TD 150A. The memory controller 120 may then update the meta-data attributes of each of the assigned physical pages of the memory in the MOT 126, including some of the following (but not limited to): the host physical address 282, page status 284, page state 286, TDID 288 of the page, and the restricted key ID 250 associated with the encryption key to be used by the memory controller 120 to encrypt/decrypt data stored in the physical page of the memory.

In some implementations, additional TDs may be enabled by the processor 112 and the hypervisor 140 (or TDRM 142) may assign additional key IDs from the list of restricted key IDs to such additional TDs, as needed. In such implementations, the memory controller 120 may need to allocate separate physical memory pages to various TDs and update the MOT 126 accordingly.

In some implementations, a physical memory page allocated by the memory controller 120 may be shared between one or more TDs and/or the hypervisor 140. In such implementations, the memory controller 120 may perform essentially the same operations as described above, but designate the page state 286 as shared for this page. The memory controller 120 may then store multiple TDIDs for TDs that may have access to the shared page. The memory controller may store a shared non-restricted key ID 250 associated with the encryption key to be used by the memory controller 120 to encrypt/decrypt data stored in the shared page of the memory.

When the memory controller 120 detects a memory transaction directed at a physical page of the memory allocated to a specific TD, the memory controller 120 may generate a fault and/or abort procedure in a number of situations, including but not limited to the following:

- A memory transaction that includes a non-restricted ID concatenated to the physical memory address whereas the physical page of the memory is a private page allocated to a TD.
- A memory transaction that includes a wrong restricted key ID concatenated to the physical memory address for which a different restricted key ID is expected.
- A memory transaction that includes a correct restricted key ID concatenated to the physical memory address but the memory transaction is initiated by a software program outside the TCB of the TD to which the restricted key ID is allocated (e.g., the memory transaction that is initiated by the hypervisor 140 or by a software program executing inside a different TD).

In particular, in the first situation, a trusted software executing in the TD 150A may erroneously concatenate a non-restricted (either shared or non-shared) MK-TME request key ID to the physical memory address of a private physical page of the memory which is encrypted (or is expected to be encrypted—in case of a write operation) with one of the restricted TDX keys allocated to the TD 150A. In this case, the memory controller 120, via the MK-TME engine 136, may detect that none of the restricted bits of the request key ID is set and that, therefore, the request key ID is not one of the restricted key IDs, in one implementation. Correspondingly, the memory controller 120 may generate a fault, e.g. a non-restricted key page fault, in response to a determination that at least one of the restricted bits of the request key ID is set (or clear, in some implementations, as discussed above). The fault may be used to inform the software program which initiated the memory transaction that a non-restricted key has been used where a restricted key is expected. In some implementations, the memory controller 120 may further detect that the memory transaction originated outside a trust computing base of the TD 150A (for example, a transaction from one of TDs 150 B-C, one of VMs 155 operating outside a TD, a hypervisor 140, and so on) and generate silent abort-page semantics. In some implementations, this may mean that write operations are silently ignored whereas read operations return the value of 1 (or 0) on all bits.

Figure 3:
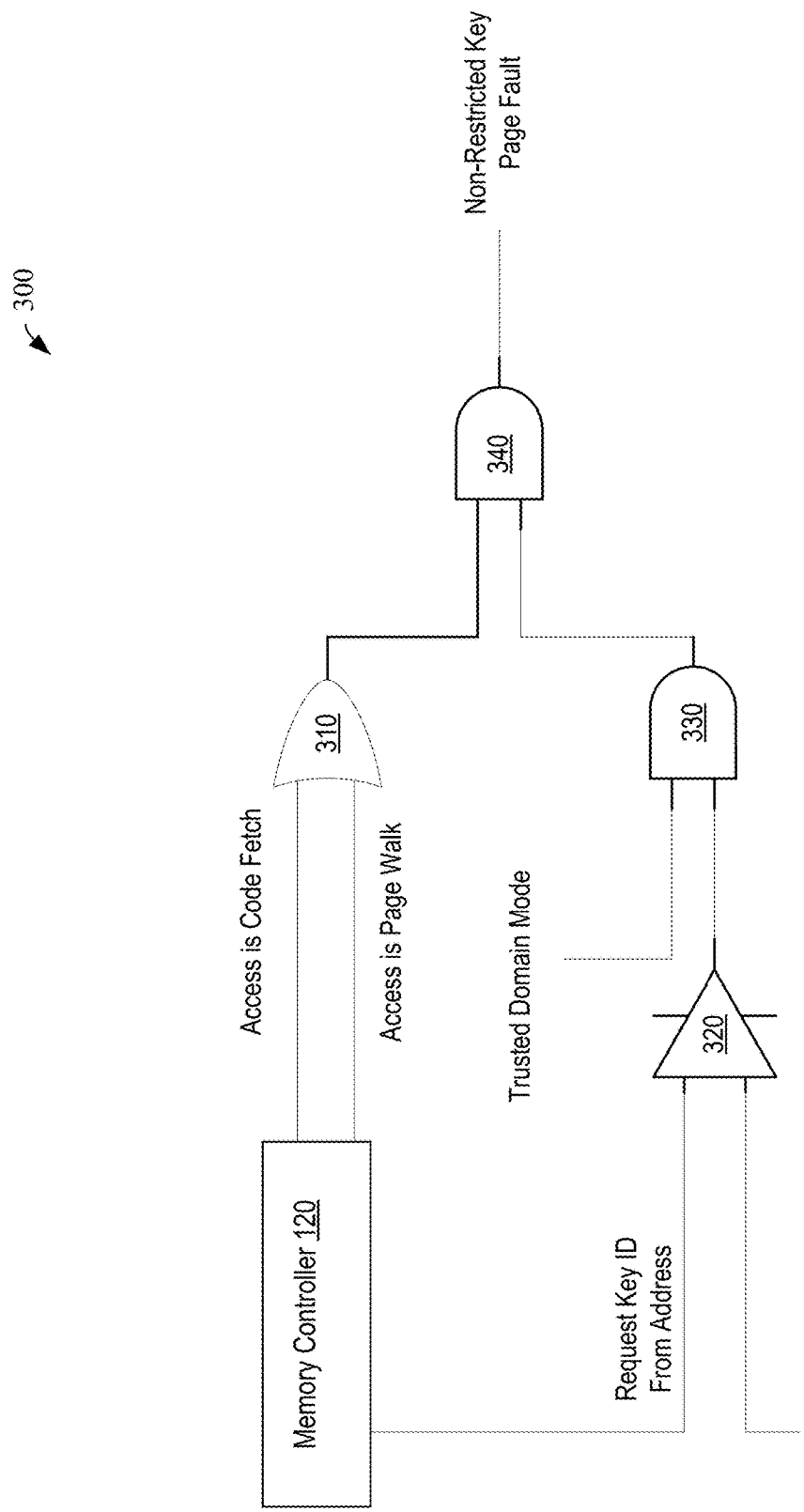
FIG. 3 is a block diagram of a gate architecture representing a portion of the memory encryption engine, according to one implementation.

FIG. 3 is a block diagram of gate architecture 300 representing a portion of the MK-TME engine 136 of the system 100 or 101, according to some implementations. The MK-TME engine 136 may include an OR gate 310, a comparator 320, a first AND gate 330, and a second AND gate 340. FIG. 3 illustrates a hardware mechanism for enforcement of appropriate use of restricted key IDs in one implementation. This hardware mechanism may serve multiple processor cores 114 or logical processors assigned to various TDs 150A-C. In some implementations, this hardware mechanism may be replicated for multiple (or all) processor core/logical processors.

In various implementations, when a software program—a hypervisor, or a program executing within one of the TDs 150A-C, or within one of the VMs 155 executing outside TDs—issues a memory transaction, the memory controller 120 may process this transaction. The OR gate 310 may trigger an output when the memory transaction involves a page walk (discussed in more detail with reference to FIGS. 4A-4B) or a code fetch access. A code fetch access may be a part of a fetch-execute cycle where the processor 112 may retrieve a program instruction from the memory 130. When the memory controller 120 detects a memory transaction, the memory controller may extract the request key ID from the bits in the physical memory address used to encode the request key ID. The comparator 320 may then determine, by comparing the key ID partition identifier with the request key ID, that the request key ID is a non-restricted key ID. For example, in one implementation, the key ID partition identifier may be a partition key ID used to identify a boundary between non-restricted key IDs and restricted key IDs. In another implementation, the partition identifier may be the number of restricted bits of the physical memory address. The comparator 320 may output the determination that the request key ID is within the non-restricted key IDs to the AND gate 330. The first AND gate 330 may receive, as its second input, an indication from one or more hardware registers 116, that a logical processor associated with the memory request is executing in a TD mode. For example, the same logical processor may be assigned to the TD 150A and one of the VMs 155 executed outside TD infrastructure, in one implementation. In another implementation, a logical processor associated with the TD 150A may have two modes of operation. When the TDRM 142 executes a TD-enter instruction on the assigned logical processor, the logical processor may begin execution in a trusted domain mode and may access memory pages encrypted with the restricted key allocated to the TD 150A. When the TDRM 142 executes a TD-exit instruction, the logical processor may interrupt execution of the TD150A, encrypt the current state of execution of the TD 150A with the restricted key ID allocated to the TD 150A, and store this state of execution in the memory 130. Subsequently, and until the next TD-enter instruction, the logical processor may operate in the untrusted mode outside the TCB of the TD 150A, and may execute instructions from the TDRM 142 or hypervisor 140, in one implementation. In the untrusted mode, the logical processor may not access memory pages encrypted with the key allocated to the TD 150A.

At the first AND gate 330, the processor core 114 may confirm, from accessing the hardware registers 116, that the logical processor is executing a memory transaction while in a trusted domain mode. The output of the first AND gate 330 may be then input to the second AND gate 340, together with the output from the OR gate 310, to generate a final output that may signal a non-restricted key fault. The non-restricted key page fault may be handled by the processor core 114 (or one of the logical processors) according to a fault procedure. In some implementations, the non-restricted key page fault is analogous to an instruction set architecture (ISA) fault, such as a reserved bit page fault. In some implementations, the memory controller 120 may execute silent abort-page semantics, as explained above.

In the second situation, a memory controller may detect a memory transaction directed at a physical page of the memory allocated to the TD 150A and encrypted (or expected to be encrypted—in case of write operations) with a first restricted key allocated to the TD 150A. The memory transaction may include a physical memory address of the physical page of the memory and a second restricted key ID allocated to a different TD, such as TD 150B. Having determined that the memory transaction addresses a memory page encrypted with a non-restricted key and includes a non-restricted key ID (albeit a wrong key ID), the memory controller 120 may not generate a non-restricted key fault. Instead, in some implementations, the memory controller 120 may reference the MOT to determine that the second key ID is not a correct attribute of the physical page of the memory. For example, the memory controller 120 may locate the host physical address (physical memory address) 282 inside the MOT 126 and determine that the key ID 250 associated with the host physical address 282 is in fact the first restricted key ID, rather than the second restricted key ID (as requested). Correspondingly, the memory controller 120 may generate a fault (e.g. a "restricted key" fault) in response to a determination that a wrong restricted key ID has been used. The fault may be used to inform the software program which initiated the memory transaction of its use of a wrong restricted key. In some implementations, the memory controller 120 may further detect whether the memory transaction originated outside the TCB of the TD 150A (for example, a transaction from one of other TDs 150 B-C) and generate an abort-page semantics, as explained above.

In the third situation, a memory controller may detect a memory transaction directed at a physical page of the memory and allocated to the TD 150A, where the memory transaction originates from a different TD, such as the TD 150B, and includes a memory address of the physical page of the memory and the first restricted key ID. Having determined that the memory transaction addresses a memory page encrypted with a non-restricted key and includes a non-restricted key ID, the memory controller 120 may not generate a non-restricted key fault. Furthermore, having determined that the memory transaction addresses a physical memory page encrypted with the first key (e.g., the right key for the memory page), the memory controller 120 may not generate a restricted key fault either. Instead, in some implementations, the memory controller 120 may determine that the memory transaction originates from TD 150B and reference the KOT to determine that the first key ID is not allocated to the TD 150B. For example, the memory controller 120 may locate the key ID 250 inside the KOT 124 and determine that the key ID 250 is allocated to the TD 150A. Correspondingly, the memory controller 120 may generate a fault (e.g., a "foreign TD" fault) in response to a determination that a foreign TD attempted to use a key ID not allocated to it. The foreign TD fault may be used to inform the software program, which initiated the memory transaction, of its attempt to address a wrong physical memory page not assigned to a TD on which the software is running. In some implementations, the memory controller 120 may generate abort-page semantics, as explained above.

In some implementations, where virtual memory is used, a memory transaction may be a transaction that uses a page walk. A memory transaction may be a reference to a linear address (e.g. a virtual address) which is then linked to a physical memory address through paging. For example, in those implementations where virtual machine architecture is used, a linear address may be a guest virtual address (GVA) generated by the hypervisor. A GVA may be mapped by guest page tables 132 to a guest physical address (GPA), which itself may be a host virtual address, in some implementations. The GPA may be further mapped by EPT 134 to a host physical address (HPA). The mapping from GPA to HPA may be enabled by the hypervisor 140 undertaking a walk in EPT.

With regards to the virtual memory and virtual machine architectures, a software operating in a TD may not have direct access to HPAs of the physical memory pages allocated to the TD by the memory controller 120. The hypervisor may allocate a non-restricted key ID to the TD for encryption of shared memory pages of the TD. The hypervisor may generate GPAs/guest page tables 132 for a given TD, in one implementation. In another implementation, the TDRM 142 may generate GPAs/guest page tables 132 for a given TD. In yet another implementation, a virtual machine monitor operating inside the TD may generate GPAs/guest page tables 132 for the TD.

Figure 4A:
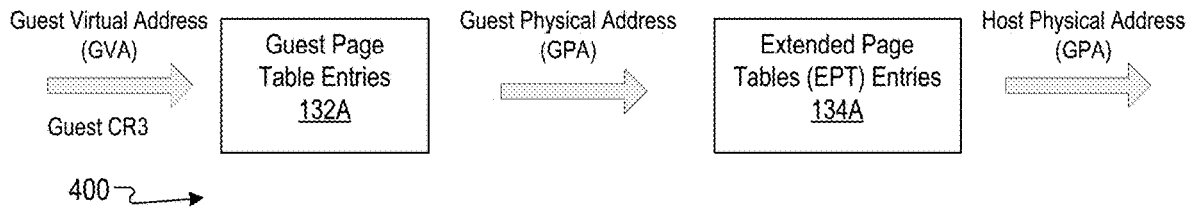
FIG. 4A is a block diagram illustrating translation of a guest virtual address to a guest physical address and of a guest physical address to a host physical address, according to an implementation.

FIG. 4A is a block diagram 400 illustrating translation of a guest virtual address (GVA) to a guest physical address (GPA) and of the GPA to a host physical address (HPA), or a physical memory address, according to an implementation. In one implementation, in order to emulate an instruction on behalf of a virtual machine, the hypervisor 140 may need to translate a linear address (e.g., a GVA) used by the instruction to a physical memory address such that the hypervisor may access data at that physical address.

In order to perform that translation, the hypervisor 140 may need to first determine paging and segmentation including examining a segmentation state of the virtual machine. The virtual machine may be executing within a TD. The hypervisor may also determine a paging mode of the virtual machine at the time of instruction invocation, including examining page tables set up by the virtual machine and examining the hardware registers 116 (e.g. control registers and MSRs) programmed by the hypervisor 140. Following discovery of paging and segmentation modes, the hypervisor may generate a GVA for a logical address, and detect any segmentation faults.

Assuming no segmentation faults are detected, the hypervisor may translate the GVA to a GPA and the GPA to an HPA, including performing a page table walk in software. To perform these translations in software, the hypervisor may load a number of paging structure entries and EPT entries originally set up by the virtual machine into general purpose hardware registers or memory. Once these paging and EPT entries are loaded, the hypervisor may perform the translations by modeling translation circuitry such as a page miss handler (PMH).

More specifically, with reference to FIG. 4A, the hypervisor 140 may load a plurality of guest page table entries 132A from the guest page tables 132 and a plurality of extended page table entries 134A from the EPT 134 that were established by the virtual machine. The hypervisor may then perform translation by walking (e.g., sequentially searching) through the guest page table entries 132A to generate a GPA from the GVA. The hypervisor may then use the GPA to walk (e.g., sequentially search) the EPT 134 to generate the HPA associated with the GPA. Use of the EPT 134 is a feature that may be used to support the virtualization of physical memory. When EPT is in use, certain addresses that would normally be treated as physical addresses (and used to access memory) are instead treated as guest-physical addresses. Guest-physical addresses are translated by traversing a set of EPT paging structures to produce physical addresses that are used to access physical memory.

Figure 4B:
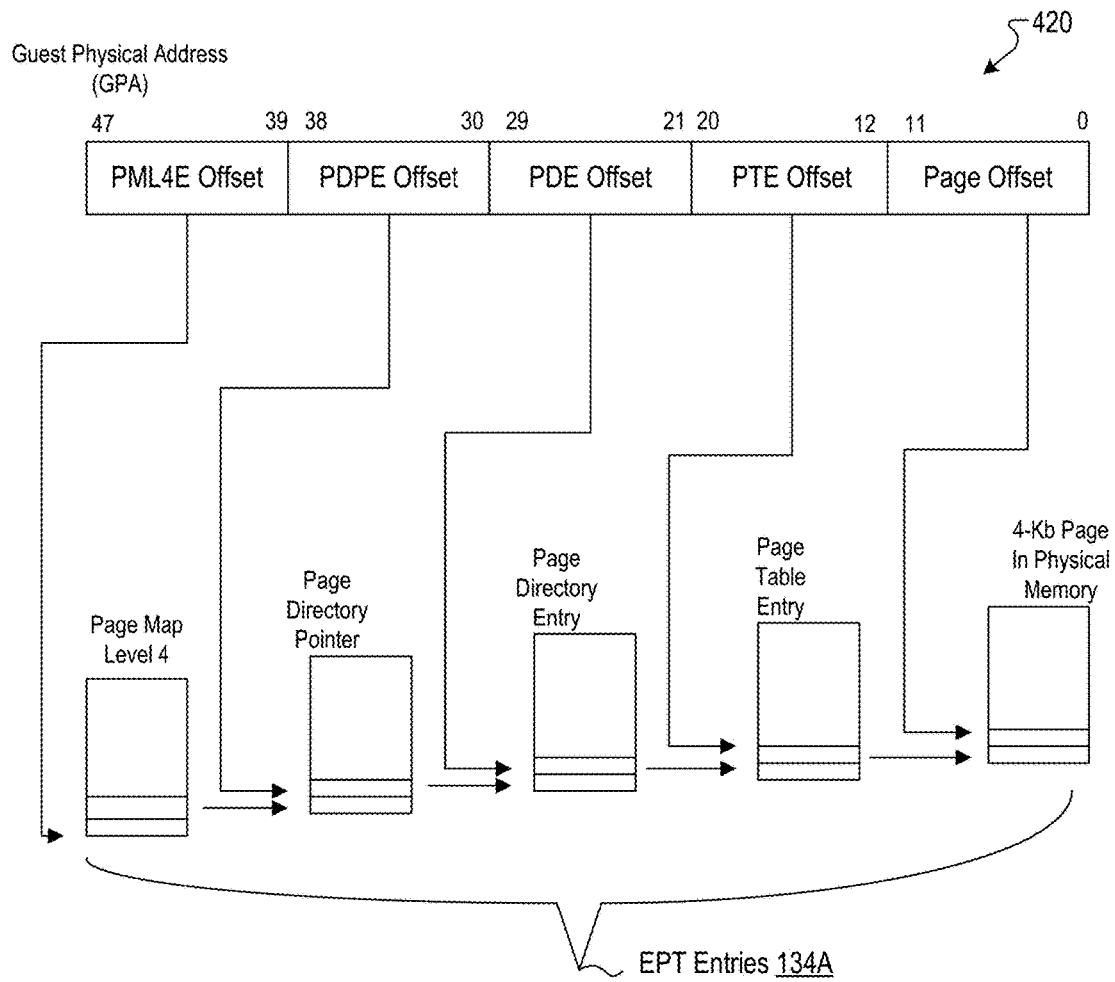
FIG. 4B is a block diagram illustrating use of extended page tables (EPT) to translate the guest physical address to the host physical address, according to an implementation.

FIG. 4B is a block diagram 420 illustrating use of EPT to translate the GPA to the HPA, according to one implementation. For example, the guest physical address (GPA) may be broken into a series of offsets, each to search within a table structure of a hierarchy of the EPT entries 134A. In this example, the EPT from which the EPT entries are derived includes a four-level hierarchal table of entries, including a page map level 4 table, a page directory pointer table, a page directory entry table, and a page table entry table. (In other implementations, a different number of levels of hierarchy may exist within the EPT, and therefore, the disclosed implementations are not to be limited by a particular implementation of the EPT.) A result of each search at a level of the EPT hierarchy may be added to the offset for the next table to locate a next result of the next level table in the EPT hierarchy. The result of the fourth (page table entry) table may be combined with a page offset to locate a 4 Kb page (for example) in physical memory, which is the host physical address.

Figure 4C:
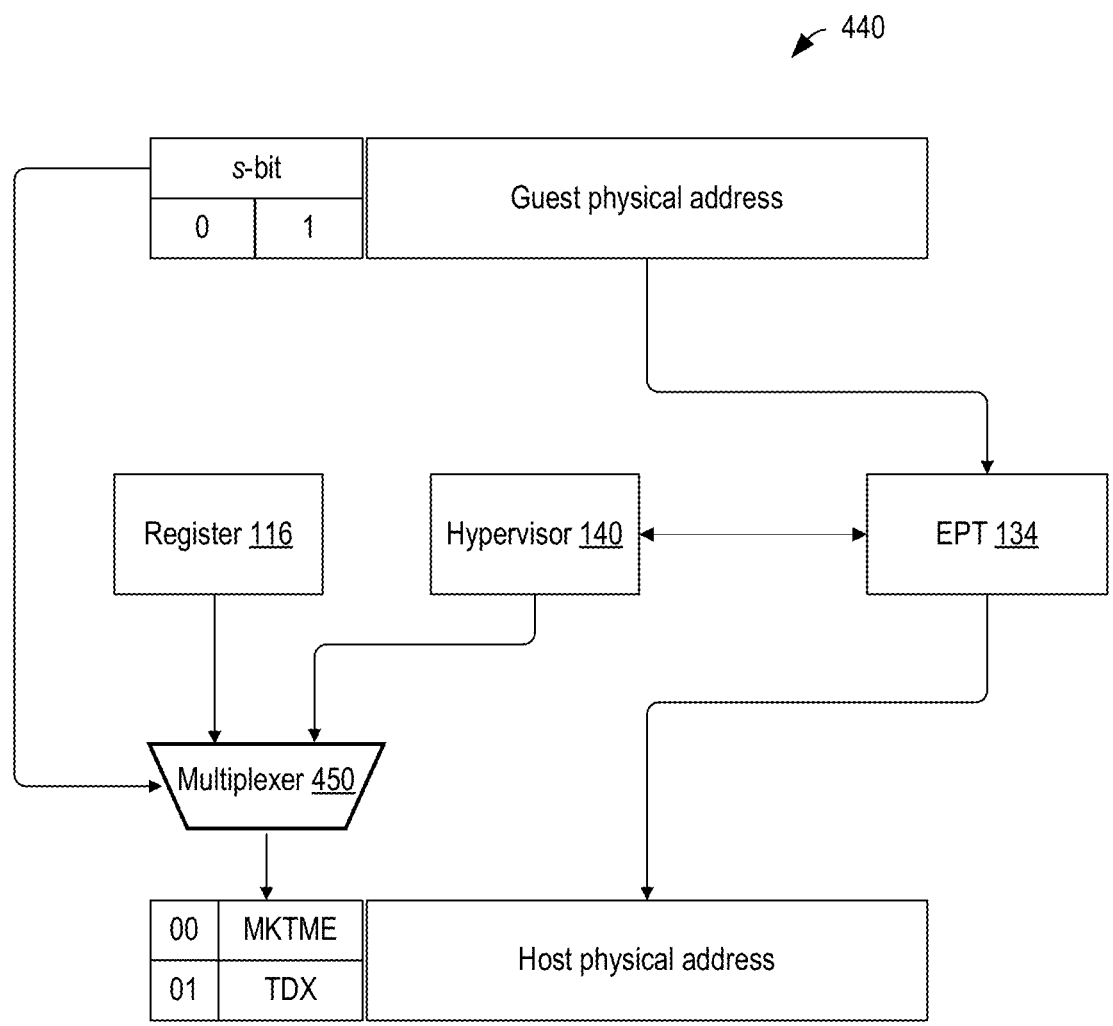
FIG. 4C is a block diagram of memory address selection hardware for mapping of a guest physical address to a host physical address using extended page tables when both the TD and MK-TME architectures are enabled, according to one implementation.

FIG. 4C is a block diagram of memory address selection hardware 440 for mapping of a guest physical address (GPA) to a host physical address (HPA) using the EPT 134 when both the TD and MK-TME architectures are enabled, according to one implementation. In the implementations enabling coexisting TDX and MK-TME architectures, the TD, the TDRM, or the hypervisor may identify a memory page used by the TD as either shared or private by setting an s-bit in the GPAs of the guest page tables 132, as illustrated in FIG. 4C. The s-bit may not be used as part of an actual address but instead serves as a status (shared/private) tag for the memory page. An s-bit in the GPA having a value of one ("1") may designate the GPA as being private to the TD. Conversely, an s-bit of the GPA having the one value may designate the GPA as being shared by the TD. (In another implementation, the values may be switched with the value of zero ("0") designating the GPA as private and one ("1") as shared.). The s-bit in the GPA may also be replicated in the associated GVA, in one implementation. In other implementations, the GVA may not include the s-bit; instead, the information about the status of the memory page may be stored in guest page tables 132 and appended to the GPA, which may be accessed during a page walk.

The hypervisor may allocate a first restricted key ID to the TD 150A. The hypervisor 140 may also allocate a second non-restricted key ID to the same TD 150A. The TD may use the encryption key associated with the first (restricted, TDX) key ID to encrypt/decrypt private memory transactions. The first TD may use the encryption key associated with the second (non-restricted, MK-TME) key to encrypt/decrypt shared memory transactions, e.g., memory transactions associated with shared hardware devices.

The hypervisor 140 may mark a physical page associated with a physical memory address (e.g., an HPA) of the memory as private or shared, within a set of guest page tables 132 for the TD, with a value of a shared bit (s-bit) in an entry for a guest virtual address (e.g., a GVA) associated with the physical page. The GVA may be referenced in the page tables 132 to map to the GPA, and the GPA may be referenced in EPT 134 to map to the HPA of the physical page of the memory. The hypervisor may translate, using the set of guest page tables 132, the GVA to the GPA, where the GPA obtained after translation also includes the s-bit with the same value as it has in the GVA.

As illustrated in FIG. 4C, in one implementation, the hypervisor 140 may translate, using the EPT 134, the GPA to the physical memory address HPA. The hypervisor may determine the value of the s-bit as set (i.e. the memory page is shared) and, consequently, generate a memory transaction including the second (non-restricted MK-TME) key ID and the host physical memory address HPA, in one implementation. The hypervisor may determine the value of the s-bit as clear (i.e. the memory page is private) and retrieve the first (restricted) key ID from a secure storage of the processor 112 (e.g. hardware register 116 or cache 118). The hypervisor may then generate a memory transaction including the first key ID and the physical memory address HPA, in one implementation.

In one implementation, a multiplexer 450 may be used to select, based on the value of the s-bit, between the first key ID and a second key ID, the second key ID including a non-restricted key ID and being appended to the second physical memory address within an entry of the EPT. The first key ID from the hardware register 116 or cache 118 (FIG. 1A) and the second key ID from the hypervisor may be input to the multiplexer 450, with the value of the s-bit being the control parameter. In one implementation, the multiplexer 450 may be implemented as part of the processor 112 hardware, such as part of the memory controller 120 or the MK-TME engine 136, for example.

In some implementations, the MK-TME key ID is appended into the first M address bits with the first M–L restricted bits having a zero value. In other implementations, which may employ different key ID partitions, the MK-TME key may be appended in the manner consistent with the specifics of the key ID partition being used.

The hypervisor 140 performing a walk in the EPT 134 may determine that the key ID associated with a requested memory transaction is one of the TDX key IDs. In one implementation, the hypervisor may determine this by detecting that one of the first M–L restricted bits is set. The hypervisor 140 may then attempt to access the physical page of the memory. The memory controller 120 may interrupt such access upon determining that untrusted software (e.g., the hypervisor) is attempting to execute a memory transaction with a restricted key ID.

When the s-bit in GPA is clear (where private page may indicate a secret page), the memory transaction key ID is one of the TDX key IDs assigned to the TD at TD creation. As explained above in reference to FIGS. 2A-2E, such key ID is guaranteed to be within the range of restricted key IDs. Therefore, the private pages of the TD are encrypted with a TD private encryption key that is associated with the TDX key ID allocated to the TD. Upon detecting that the s-bit in GPA is clear and after mapping from the GVA to the HPA, the hypervisor 140 may generate a memory transaction that includes the restricted TDX key ID and the host physical memory address.

Referring back to FIG. 3, a non-restricted key page fault may likewise be generated by the gate architecture 300 when the processor 112, while in a trust domain mode, detects that a page table walk—e.g., a walk of the guest page tables 132 or the EPT 134—is made with a non-restricted key ID. The OR gate 310 may receive, from the memory controller 120, an indication that the physical memory address HPA is obtained from a memory transaction that uses a page walk, i.e. a transaction that uses the guest page tables 132 and the EPT 134 for address translation. Accordingly, when the comparator 320 verifies that the request key ID belongs to the non-restricted range of key IDs and the first AND gate 330 further detects that the processor 112 operates in the TD mode, the output of the second AND gate 340 will be a non-restricted page fault. The mechanism described here ensures that, in TD mode, only page tables encrypted with TDX restricted keys may be used, in one implementation. A different implementation of this mechanism may divide the restricted key ID space even further, for example, allocating a specific restricted key ID for code, a separate restricted key ID for page tables, and another key ID for general private memory allocated to the TD. Other implementations of this mechanism may generate other architectural faults under these conditions, such as a # GP (general-protection) fault.

FIG. 5 illustrates an example method to enable coexistence of TDX and MK-TME architectures on the same computing device, such as a system 100 supporting virtual machines or a computing system 101 without virtualization, referring back to FIGS. 1A and 1C. Method 500 may be performed by processing logic that may include hardware (e.g., circuitry, dedicated logic, programmable logic, microcode, etc.), software (such as operations being performed by the TDRM or VMM), firmware or a combination thereof. In one implementation, method 500 is performed by the processor 112 of FIG. 1. In another implementation, the method 500 is performed by any of the processing devices described with respect to FIGS. 7A-13. Alternatively, other components of the system 100 (or software executing on the processor 112) may perform some or all of the operations of the method 500.

With further reference to FIG. 5, the method 500 may begin with the processing logic storing a first value for a first number of address bits of physical memory addresses used for key IDs in a hardware register, e.g., in one of the hardware registers 116 (FIG. 1A) (510). In one implementation, the key IDs are associated with encryption keys. In one implementation, the first number of address bits may be the total number of address bits M, as explained above.

The method 500 may continue with the processing logic storing in the hardware register, a partition identifier to partition key IDs into non-restricted key IDs and restricted key IDs (520). The partition identifier may be a partition key ID used to identify a boundary between non-restricted key IDs and restricted key IDs. In some implementations, the partition identifier may include a number of restricted bits M–L, and further include the location of the restricted bits. In one implementation, the restricted bits are the upper M–L bits of the M total bits used for key ID encoding. In another implementation, the restricted bits are non-contiguous. In yet another implementation, there is only one restricted bit which may be the lowest of the M bits.

The method 500 may continue with the processing logic executing a hypervisor (530). The hypervisor may be a software program supported by the operating system of the host computing system and, in turn, enabling virtual machines environment. The method 500 may continue with processing logic allocating the non-restricted key IDs to the hypervisor 140. The non-restricted key IDs may correspond to the encryption keys that are enabled by MK-TME engine 136 of the processor 112 and used by the hypervisor 140 to encrypt data residing in the physical memory pages allocated to the hypervisor and used by the hypervisor to run VMs 155 executed outside TDs.

The method 500 may continue with the processing logic allocating to a first TD of a TD infrastructure, a first key ID, where the first key ID is one of the restricted key IDs (550). The method 500 may continue with allocating a first physical page of the memory 130 to the first TD, where data in the first physical page of the memory is to be encrypted with an encryption key associated with the first key ID.

Figure 6:
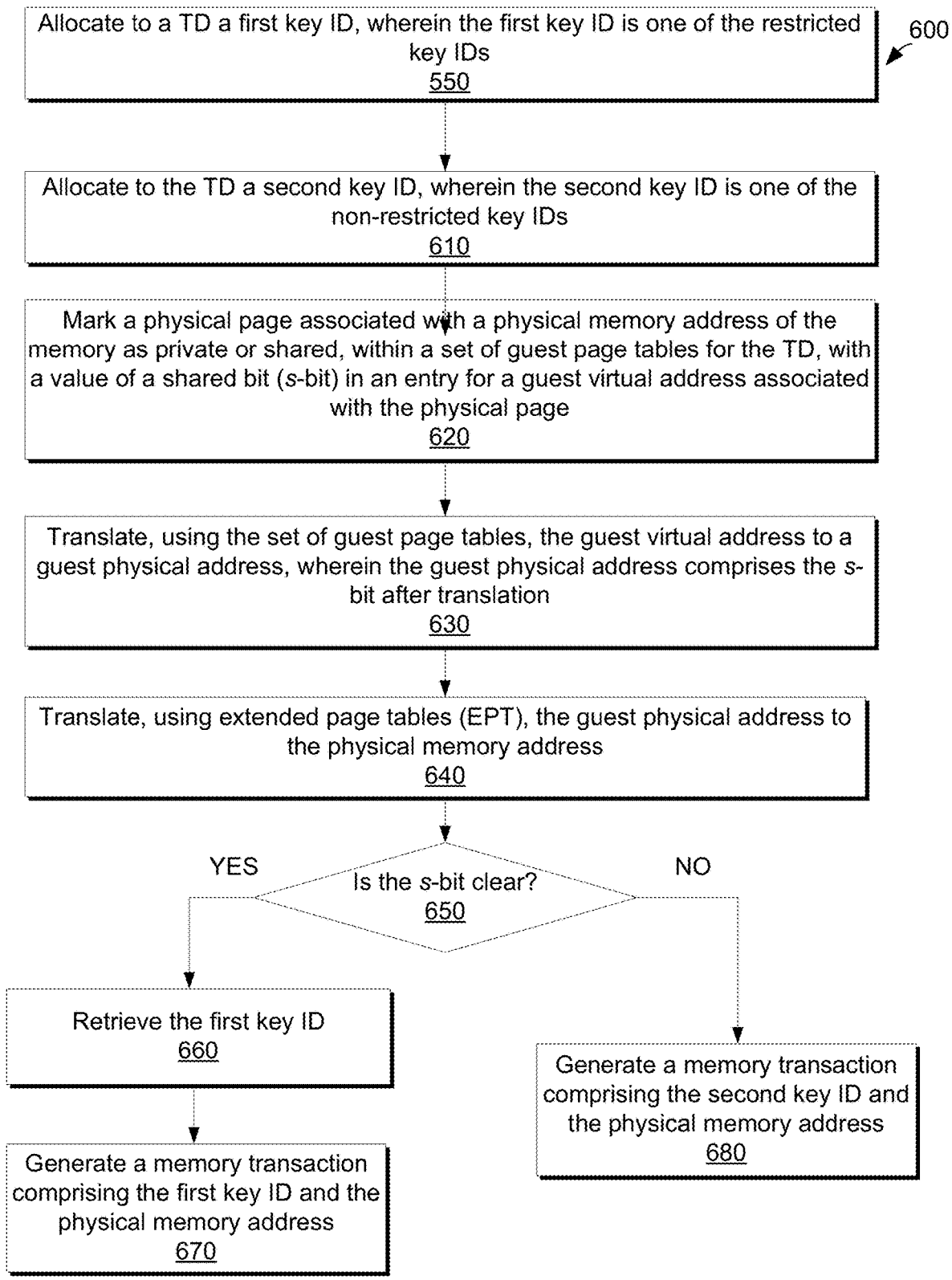
FIG. 6 is a flow diagram of an example method to enable coexistence of TD and MK-TME technologies further enabling memory paging, according to one implementation.

FIG. 6 illustrates an example method to enable coexistence of TD and MK-TME technologies further enabling memory paging. Method 600 may be performed by processing logic that may include hardware (e.g., circuitry, dedicated logic, programmable logic, microcode, etc.), software (such as operations being performed by the TDRM or VMM), firmware or a combination thereof. The method 600 may begin with the processing logic performing the steps 510 through 560, as described above, of the method 600. For example, the processing logic may allocate a first key ID to a TD where the first key ID is one of the restricted key IDs, similar to step 550 of the method 500. Other steps of the method 500 are not explicitly repeated in FIG. 6, for the sake of compactness, but may be understood to be implemented within the method 600 of FIG. 6 as well.

The method 600 may continue with the processing logic allocating, e.g., by the hypervisor 140, a second key ID to the first TD, where the second key ID is one of the non-restricted key IDs (610). The first TD may use the encryption key associated with the first key ID to encrypt/decrypt private memory transactions. The first TD may use the encryption key associated with the second key to encrypt/decrypt shared memory transactions, e.g., memory transactions associated with shared hardware devices.

The method 600 may continue with the processing logic marking a physical page associated with a physical memory address (e.g., an HPA) of the memory as private or shared, within a set of guest page tables for the TD, with a value of a shared bit (s-bit) in an entry for a guest physical address (e.g., a GPA) associated with the physical page (620). The GPA may be referenced in EPT 134 to map to the HPA of the physical page of the memory. The marking with the s-bit value may include setting, in one implementation, the s-bit value to 0 to designate the physical page as private, and setting the s-bit value to 1 to designate the physical page as shared. In another implementation, the two values may implement the opposite designations.

The method 600 may continue with the processing logic translating, using the set of guest page tables, the GVA to the GPA, where the GPA obtained after translation also comprise the s-bit with the same value as it has in the GVA (630). The method 600 may continue with the processing logic translating using EPT 134, the GPA to the physical memory address HPA (640). The method 600 may continue with the processing logic determining whether the s-bit value is "private" (e.g. 0, the bit is "clear") or "shared" (e.g. 1, the bit is "set") (650). If the s-bit value is determined to be 0 (indicating a private physical memory page), the method 600 may proceed with the processing logic retrieving the first (restricted) key ID allocated to the TD (660). For example, the processing logic may retrieve the first key ID from the MOT 126 stored inside the processor 112. Alternatively, the processing logic may retrieve the first key from the hypervisor 140 or TDRM 142.

The method 600 may continue with the processing logic generating a memory transaction comprising the first (restricted TDX) key ID and the physical memory address HPA, in one implementation (670). If, however, the processing logic determines that the s-bit value is set (indicating a shared memory page), the method 600 may proceed with the processing logic generating a memory transaction comprising the second (non-restricted MK-TME) key ID and the host physical memory address HPA, in one implementation (680).

Figure 7A:
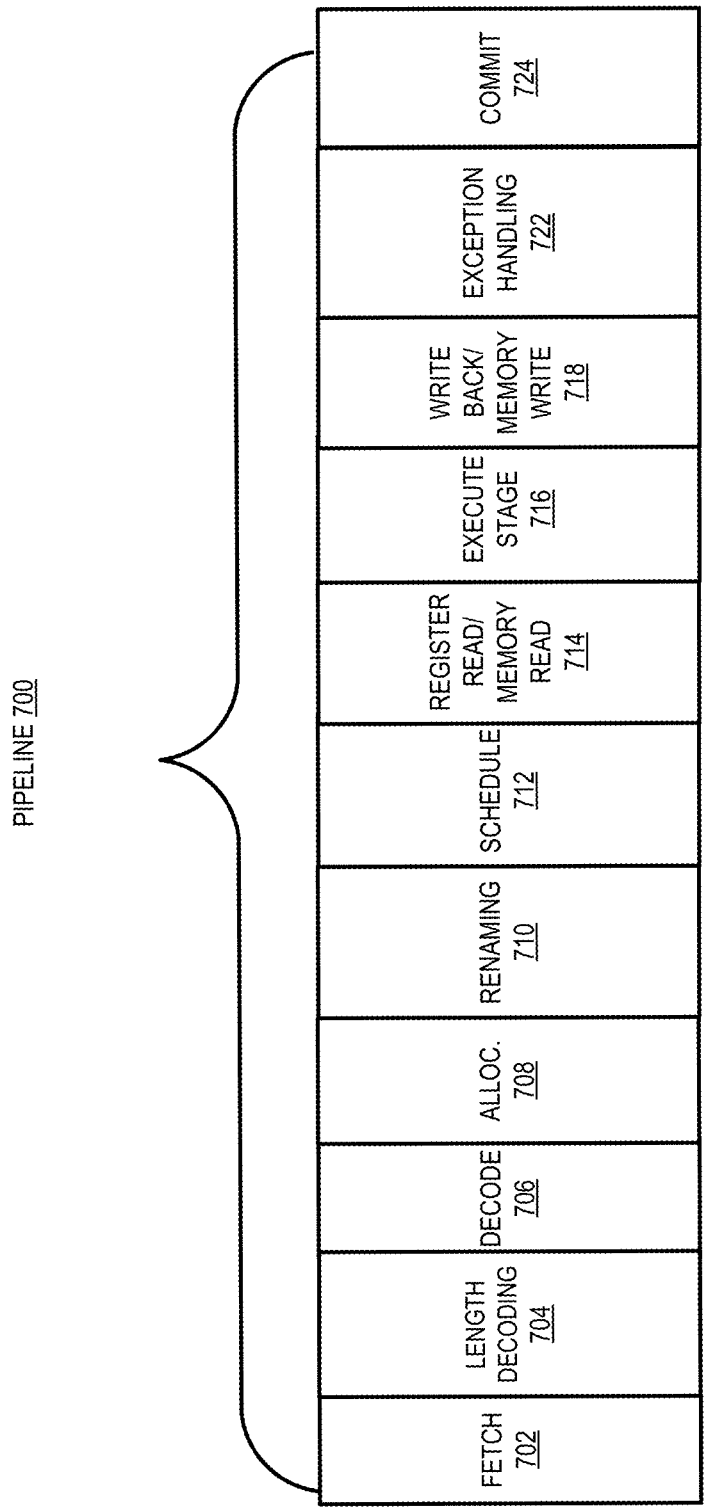
FIG. 7A is a block diagram illustrating a micro-architecture for a processor in which one implementation of the disclosure may be used.
Figure 7B:
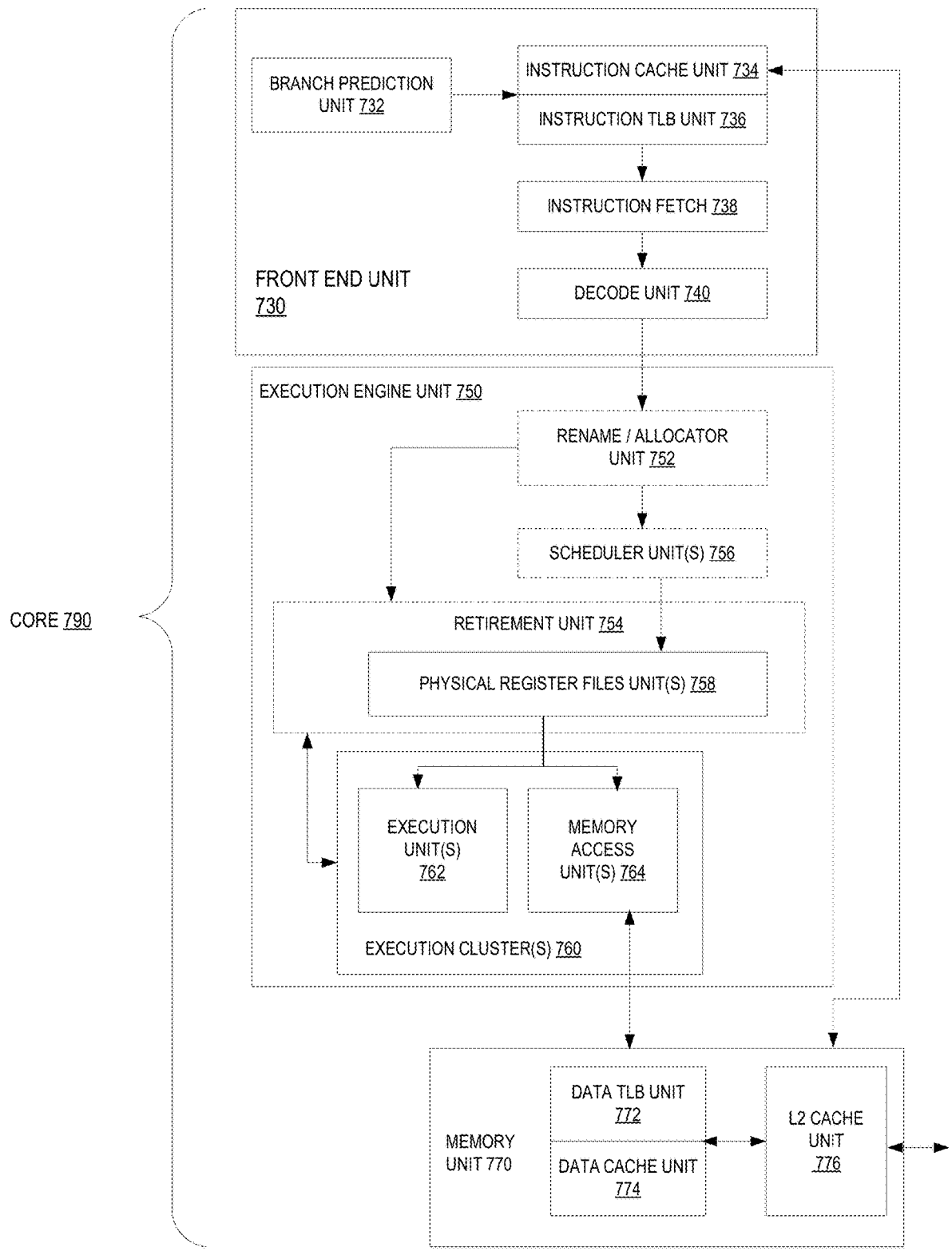
FIG. 7B is a block diagram illustrating an in-order pipeline and a register renaming stage, out-of-order issue/execution pipeline implemented according to at least one implementation of the disclosure.

FIG. 7A is a block diagram illustrating an in-order pipeline and a register re-naming stage, out-of-order issue/execution pipeline of a processor monitoring performance of a processing device to provide co-existence of trust domain architecture with multi-key total memory encryption technology according to at least one implementation of the disclosure. FIG. 7B is a block diagram illustrating an in-order architecture core and a register renaming logic, out-of-order issue/execution logic to be included in a processor according to at least one implementation of the disclosure. The solid lined boxes in FIG. 7A illustrate the in-order pipeline, while the dashed lined boxes illustrates the register renaming, out-of-order issue/execution pipeline. Similarly, the solid lined boxes in FIG. 7B illustrate the in-order architecture logic, while the dashed lined boxes illustrates the register renaming logic and out-of-order issue/execution logic.

In FIG. 7A, a processor pipeline 700 includes a fetch stage 702, a length decoding stage 704, a decode stage 706, an allocation stage 708, a renaming stage 710, a schedule (also known as a dispatch or issue) stage 712, a register read/memory read stage 714, an execute stage 716, a write back/memory write stage 718, an exception handling stage 722, and a commit stage 724. In some implementations, the stages are provided in a different order and different stages may be considered in-order and out-of-order.

In FIG. 7B, arrows denote a coupling between two or more units and the direction of the arrow indicates a direction of data flow between those units. FIG. 7B shows processor core (core) 790 including a front end unit 730 coupled to an execution engine unit 750, and both are coupled to a memory unit 770.

The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 734 is further coupled to a level 2 (L2) cache unit 776 in the memory unit 770. The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 758 is overlapped by the retirement unit 754 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point).

While some implementations may include a number of execution units dedicated to specific functions or sets of functions, other implementations may include one execution unit or multiple execution units that all perform all functions. The scheduler unit(s) 756, physical register file(s) unit(s) 758, and execution cluster(s) 760 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary implementation, the memory access units 764 may include a load unit, a store address unit, and a store data unit, each of which is coupled to the data TLB unit 772 in the memory unit 770. The L2 cache unit 776 is coupled to one or more other levels of cache and eventually to a main memory.

By way of example, the exemplary register renaming, out-of-order issue/execution core architecture may implement the pipeline 700 of FIG. 7A as follows: 1) the instruction fetch 38 performs the fetch and length decoding stages 702 and 704 respectively; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated implementation of the processor also includes a separate instruction and data cache units 734/774 and a shared L2 cache unit 776, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 8:
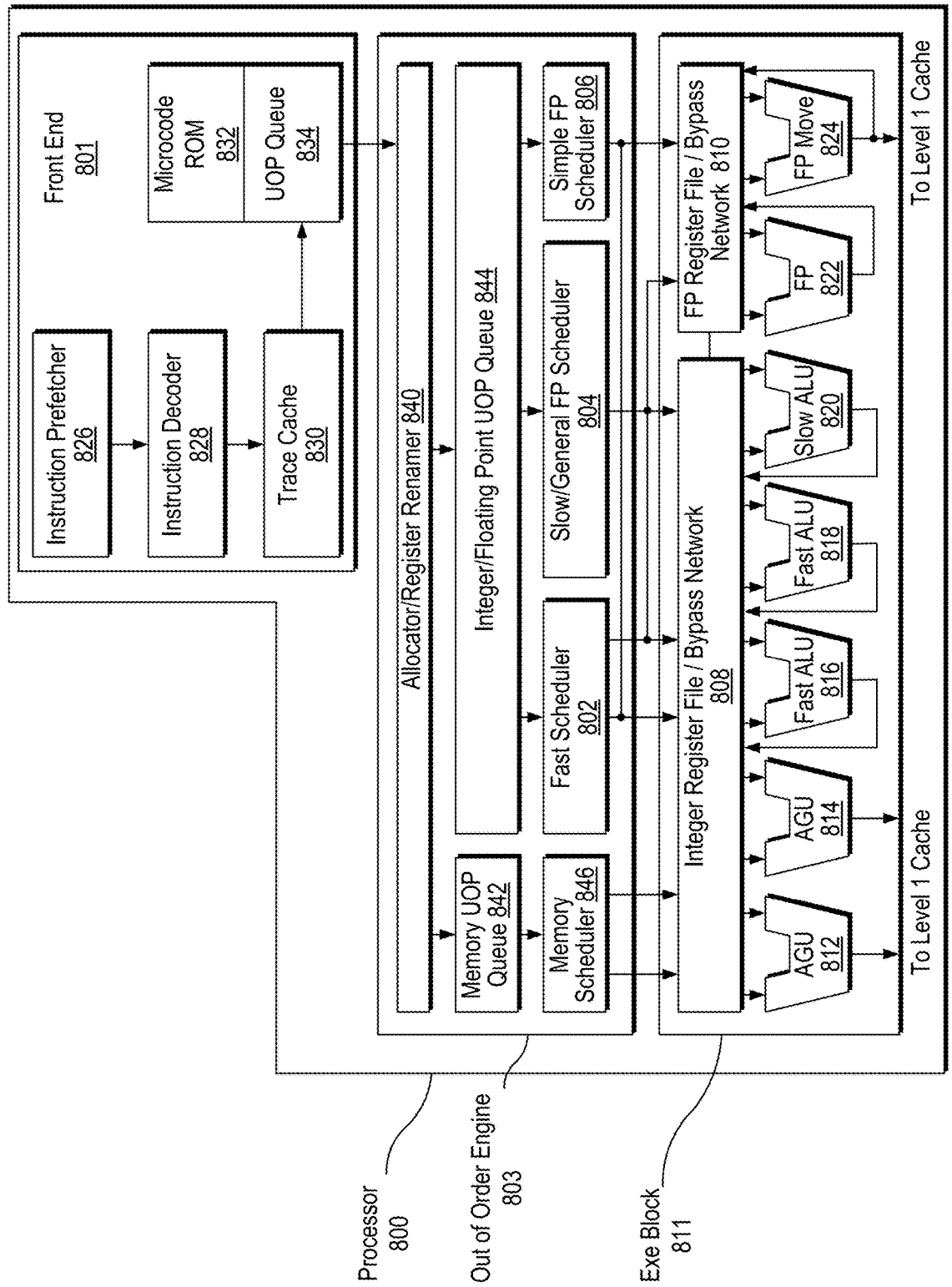
FIG. 8 illustrates a block diagram of the micro-architecture for a processing device that includes logic circuits to provide co-existence of trust domain architecture with multi-key total memory encryption technology in virtualized systems using trust domains according to one implementation.

FIG. 8 illustrates a block diagram of the micro-architecture for a processing device 800 that includes logic circuits to provide co-existence of trust domain architecture with multi-key total memory encryption technology according to at least one implementation of the disclosure. In some implementations, an instruction may be implemented to operate on data elements having sizes of byte, word, doubleword, quadword, etc., as well as datatypes, such as single and double precision integer and floating point datatypes. In one implementation the in-order front end 801 is the part of the processing device 800 that fetches instructions to be executed and prepares them to be used later in the processing device pipeline. The implementations of providing co-existence of trust domain architecture with multi-key total memory encryption technology may be implemented in processing device 800.

The front end 801 may include several units. In one implementation, the instruction prefetcher 826 fetches instructions from memory and feeds them to an instruction decoder 828 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 830 takes decoded uops and assembles them into program ordered sequences or traces in the uop queue 834 for execution. When the trace cache 830 encounters a complex instruction, the microcode ROM 832 provides the uops needed to complete the operation.

Some instructions are converted into a single micro-op, whereas others need several micro-ops to complete the full operation. In one implementation, if more than four micro-ops are needed to complete an instruction, the decoder 818 accesses the microcode ROM 832 to do the instruction. For one implementation, an instruction may be decoded into a small number of micro ops for processing at the instruction decoder 828. In another implementation, an instruction may be stored within the microcode ROM 832 should a number of micro-ops be needed to accomplish the operation. The trace cache 830 refers to an entry point programmable logic array (PLA) to determine a correct micro-instruction pointer for reading the micro-code sequences to complete one or more instructions in accordance with one implementation from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The allocator/register renaming logic 840 renames logic registers onto entries in a register file. The allocator 840 also allocates an entry for each uop in one of the two uop queues, one for memory operations 842 and one for non-memory operations 844, in front of the instruction schedulers: memory scheduler 846, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one implementation may schedule on each half of the main clock cycle while the other schedulers may only schedule once per main processing device clock cycle. The schedulers arbitrate for the dispatch ports to schedule uops for execution.

Register files 808, 810, sit between the schedulers 802, 804, 806, and the execution units 812, 814, 816, 818, 820, 822, 824 in the execution block 811. There is a separate register file 808, 810, for integer and floating point operations, respectively. Each register file 808, 810, of one implementation also includes a bypass network that may bypass or forward just completed results that have not yet been written into the register file to new dependent uops. The integer register file 808 and the floating point register file 810 are also capable of communicating data with the other. For one implementation, the integer register file 808 is split into two separate register files, one register file for the low order 32 bits of data and a second register file for the high order 32 bits of data. The floating point register file 810 of one implementation has 128 bit wide entries because floating point instructions typically have operands from 64 to 128 bits in width.

The execution block 811 contains the execution units 812, 814, 816, 818, 820, 822, 824, where the instructions are actually executed. This section includes the register files 808, 810, that store the integer and floating point data operand values that the micro-instructions need to execute. The processing device 800 of one implementation is comprised of a number of execution units: address generation unit (AGU) 812, AGU 814, fast ALU 816, fast ALU 818, slow ALU 820, floating point ALU 822, floating point move unit 824. For one implementation, the floating point execution blocks 812, 814, execute floating point, MMX, SIMD, and SSE, or other operations. The floating point ALU 812 of one implementation includes a 64 bit by 64 bit floating point divider to execute divide, square root, and remainder micro-op s. For implementations of the disclosure, instructions involving a floating point value may be handled with the floating point hardware.

In one implementation, the ALU operations go to the high-speed ALU execution units 816, 818. The fast ALUs 816, 818, of one implementation may execute fast operations with an effective latency of half a clock cycle. For one implementation, most complex integer operations go to the slow ALU 820 as the slow ALU 820 includes integer execution hardware for long latency type of operations, such as a multiplier, shifts, flag logic, and branch processing. Memory load/store operations are executed by the AGUs 812, 814. For one implementation, the integer ALUs 816, 818, 820, are described in the context of performing integer operations on 64 bit data operands. In alternative implementations, the ALUs 816, 818, 820, may be implemented to support a variety of data bits including 16, 32, 128, 256, etc. Similarly, the floating point units 822, 824, may be implemented to support a range of operands having bits of various widths. For one implementation, the floating point units 822, 824, may operate on 128 bits wide packed data operands in conjunction with SIMD and multimedia instructions.

In one implementation, the uops schedulers 802, 804, 806, dispatch dependent operations before the parent load has finished executing. As uops are speculatively scheduled and executed in processing device 800, the processing device 800 also includes logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processing device are also designed to catch instruction sequences for text string comparison operations.

The processing device 800 also includes logic to provide co-existence of trust domain architecture with multi-key total memory encryption technology according to one implementation. In one implementation, the execution block 811 of processing device 800 may include TDRM 142, MOT 126, and TDCS to provide co-existence of trust domain architecture with multi-key total memory encryption technology, according to the description herein.

The term "registers" may refer to the on-board processing device storage locations that are used as part of instructions to identify operands. In other words, registers may be those that are usable from the outside of the processing device (from a programmer's perspective). However, the registers of an implementation should not be limited in meaning to a particular type of circuit. Rather, a register of an implementation is capable of storing and providing data, and performing the functions described herein. The registers described herein may be implemented by circuitry within a processing device using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessing devices enabled with MMX technology from Intel Corporation of Santa Clara, Calif. These MMX registers, available in both integer and floating point forms, may operate with packed data elements that accompany SIMD and SSE instructions. Similarly, 128 bits wide XMM registers relating to SSE2, SSE3, SSE4, or beyond (referred to generically as "SSEx") technology may also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 9:
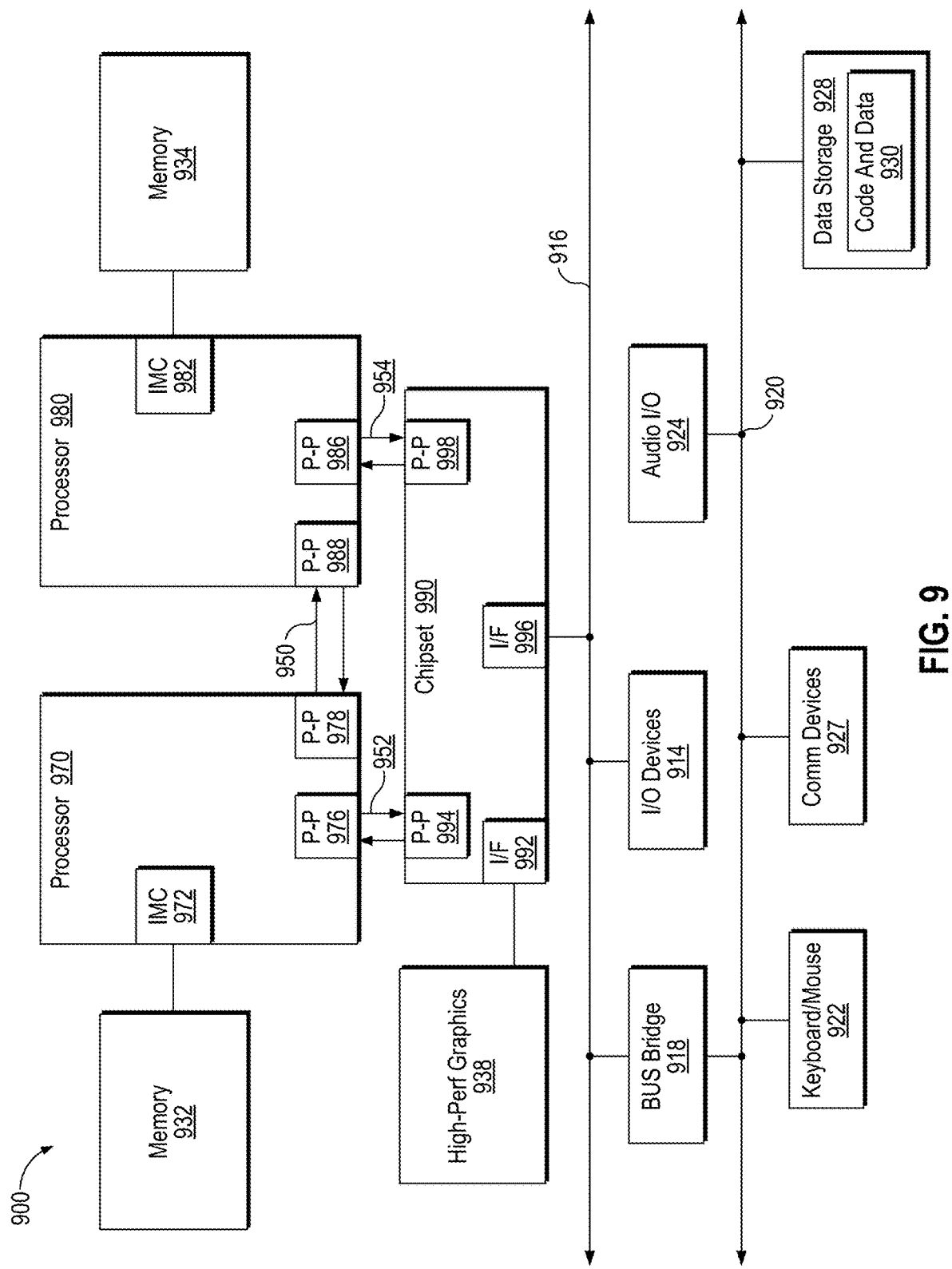
FIG. 9 is a block diagram of a computer system according to one implementation.

Implementations to provide co-existence of trust domain architecture with multi-key total memory encryption technology may be implemented in many different system types. Referring now to FIG. 9, shown is a block diagram of a multiprocessing device system 900 in accordance with an implementation. As shown in FIG. 9, multiprocessing device system 900 is a point-to-point interconnect system, and includes a first processing device 970 and a second processing device 980 coupled via a point-to-point interconnect 950. As shown in FIG. 9, each of processing devices 970 and 980 may be multicore processing devices, including first and second processing device cores (not shown), although potentially many more cores may be present in the processing devices. The processing devices each may include hybrid write mode logics in accordance with an implementation of the present. The implementations to provide co-existence of trust domain architecture with multi-key total memory encryption technology may be implemented in the processing device 970, processing device 980, or both.

While shown with two processing devices 970, 980, it is to be understood that the scope of the disclosure is not so limited. In other implementations, one or more additional processing devices may be present in a given processing device.

Processors 970 and 980 are shown including integrated memory controller units (IMCs) 972 and 982, respectively. Processing device 970 also includes as part of its bus controller units point-to-point (P-P) interfaces 976 and 978; similarly, second processing device 980 includes P-P interfaces 986 and 988. Processing devices 970, 980 may exchange information via a point-to-point (P-P) interface 950 using P-P interface circuits 978, 988. As shown in FIG. 9, IMCs 972 and 982 couple the processing devices to respective memories, namely a memory 932 and a memory 934, which may be portions of main memory locally attached to the respective processing devices.

Processors 970, 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 992.

A shared cache (not shown) may be included in either processing device or outside of both processing devices, yet connected with the processing devices via P-P interconnect, such that either or both processing devices' local cache information may be stored in the shared cache if a processing device is placed into a low power mode.

Chipset 990 may be coupled to a first bus 916 via an interface 996. In one implementation, first bus 916 may be a Peripheral Component Interconnect (PCI) bus, or a bus such as a PCI Express bus or another third generation I/O interconnect bus, although the scope of the disclosure is not so limited.

As shown in FIG. 9, various I/O devices 914 may be coupled to first bus 916, along with a bus bridge 918 which couples first bus 916 to a second bus 920. In one implementation, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one implementation. Further, an audio I/O 924 may be coupled to second bus 920. Note that other architectures are possible. For example, instead of the point-to-point architecture of FIG. 9, a system may implement a multi-drop bus or other such architecture.

Figure 10:
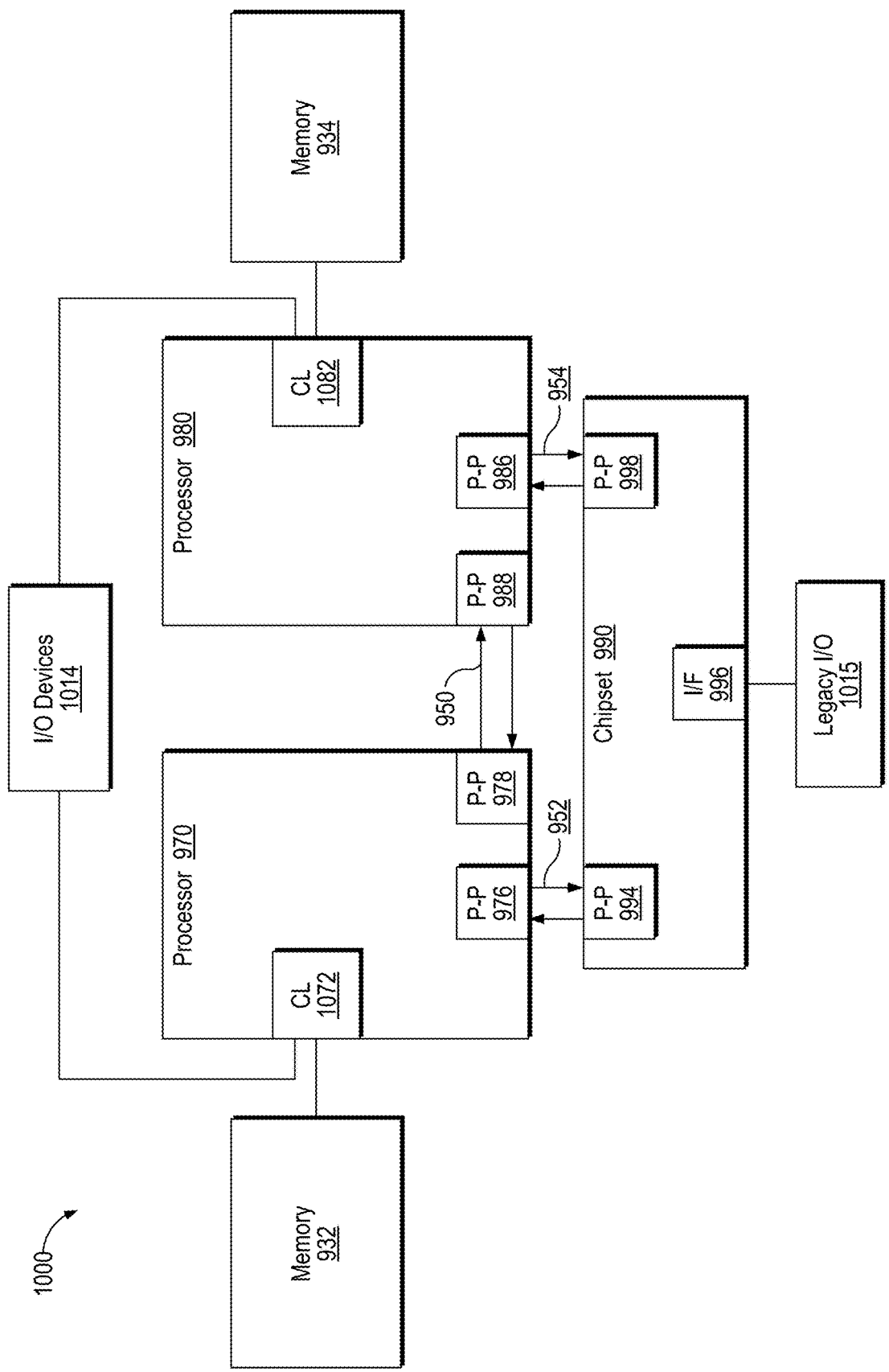
FIG. 10 is a block diagram of a computer system according to another implementation.

Referring now to FIG. 10, shown is a block diagram of a third system 1000 in accordance with an implementation of the disclosure. Like elements in FIGS. 9 and 10 bear like reference numerals, and certain aspects of FIG. 9 have been omitted from FIG. 10 in order to avoid obscuring other aspects of FIG. 10.

FIG. 10 illustrates processors 970, 980. In one embodiment, processors 970, 980 may implement hybrid cores. Processors 970, 980 may include integrated memory and I/O control logic ("CL") 1072 and 1082, respectively, and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one implementation, the CL 1072, 1082 may include IMCs 972, 982 as described herein. In addition, CL 1072, 1082 may also include I/O control logic. FIG. 10 illustrates that the memories 932, 934 are coupled to the CL 1072, 1082, and that I/O devices 1014 are also coupled to the CL 1072, 1082. Legacy I/O devices 1015 are coupled to the chipset 990 via interface 996. The implementations to provide co-existence of trust domain architecture with multi-key total memory encryption technology may be implemented in processing device 970, processing device 980, or both.

Figure 11:
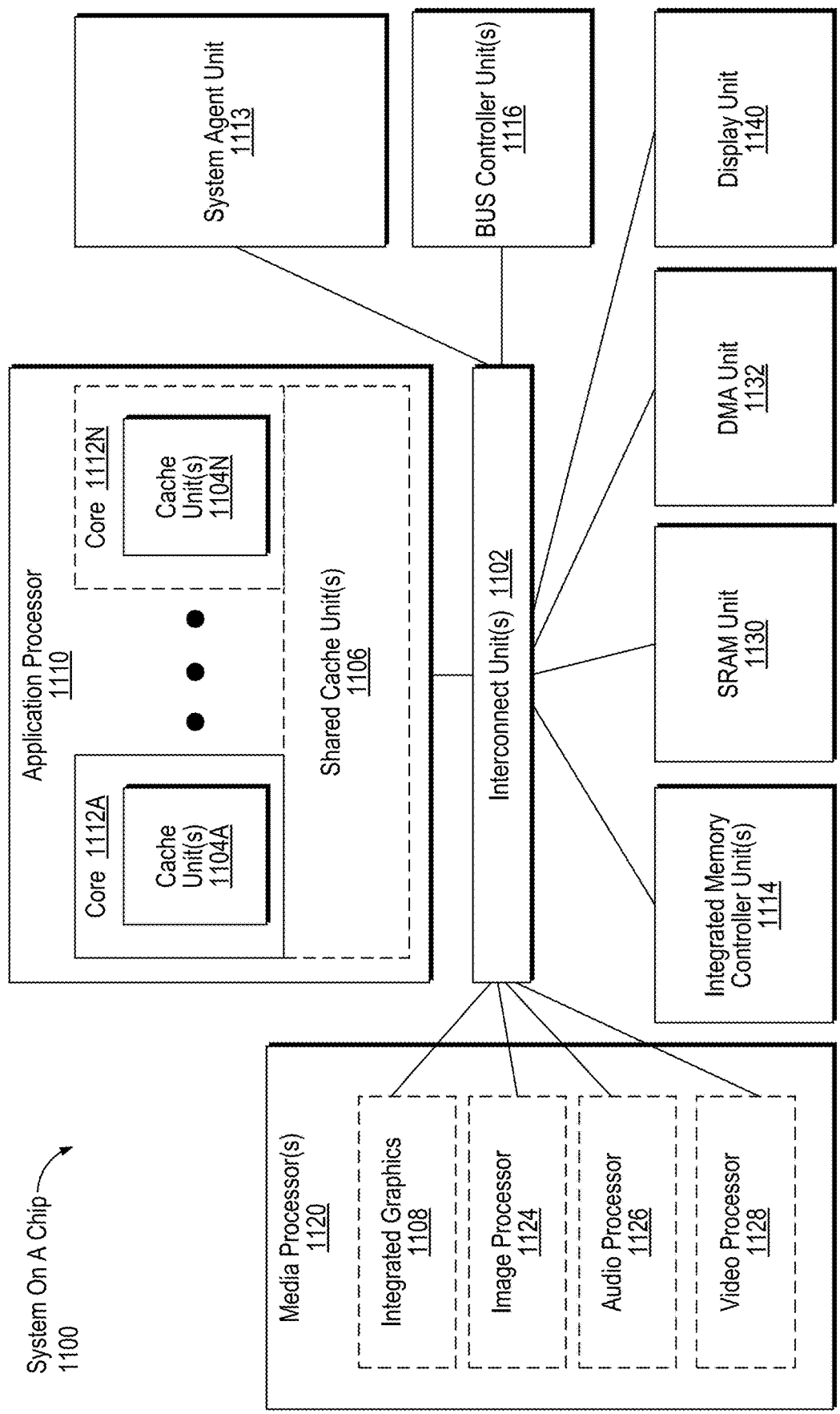
FIG. 11 is a block diagram of a system-on-a-chip according to one implementation.

FIG. 11 is an example system on a chip (SoC) 1100 that may include one or more of the cores 1112A . . . 1112N of the application processor 1110. Other system designs and configurations known in the arts for laptops, desktops, handheld PCs, personal digital assistants, engineering workstations, servers, network devices, network hubs, switches, embedded processing devices, digital signal processing devices (DSPs), graphics devices, video game devices, set-top boxes, micro controllers, cell phones, portable media players, hand held devices, and various other electronic devices, are also suitable. In general, a huge variety of systems or electronic devices capable of incorporating a processing device and/or other execution logic as disclosed herein are generally suitable.

Referring now to FIG. 11, shown is a block diagram of a SoC 1100 in accordance with an implementation of the disclosure. Also, dashed lined boxes are features on more advanced SoCs. In FIG. 11, an interconnect unit(s) 1102 is coupled to: the application processor 1110 which includes a set of one or more cores 1112A-N, containing one or more cache unit(s) 1104A . . . 1104N, respectively, and shared cache unit(s) 1106; a system agent unit 1113; a bus controller unit(s) 1116; an integrated memory controller unit(s) 1114; a set or one or more media processing devices 1120 which may include integrated graphics logic 1108, an image processing device 1124 for providing still and/or video camera functionality, an audio processing device 1126 for providing hardware audio acceleration, and a video processing device 1128 for providing video encode/decode acceleration; a static random access memory (SRAM) unit 1130; a direct memory access (DMA) unit 1132; and a display unit 1140 for coupling to one or more external displays. The implementations to provide co-existence of trust domain architecture with multi-key total memory encryption technology may be implemented in SoC 1100.

Figure 12:
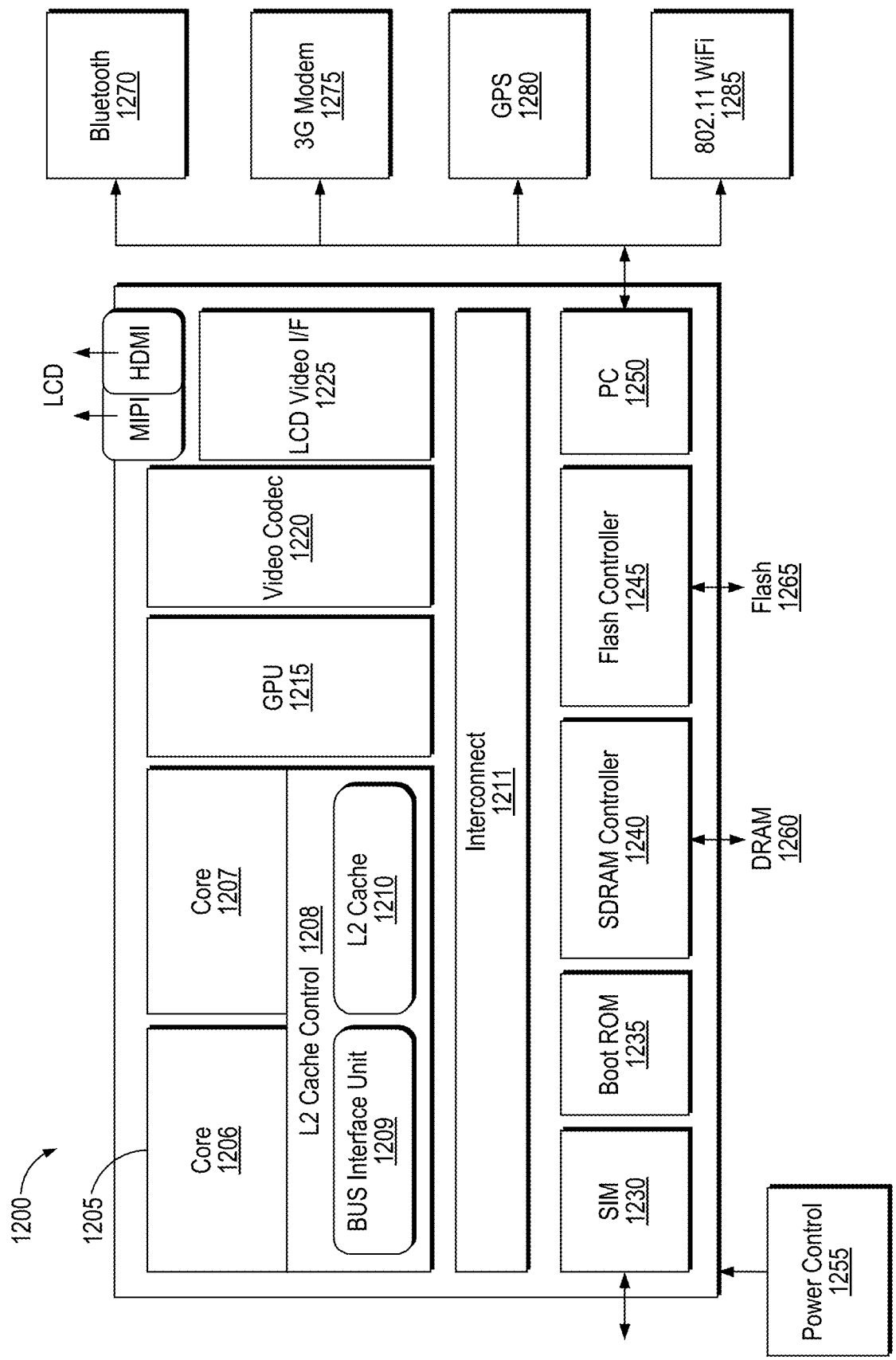
FIG. 12 illustrates another implementation of a block diagram for a computing system.

Turning next to FIG. 12, an implementation of an SoC design in accordance with implementations of the disclosure is depicted. As an illustrative example, SoC 1200 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which may correspond in nature to a mobile station (MS) in a GSM network. The implementations to provide co-existence of trust domain architecture with multi-key total memory encryption technology may be implemented in SoC 1200.

Here, SoC 1220 includes 2 cores—1206 and 1207. Similar to the discussion above, cores 1206 and 1207 may conform to an Instruction Set Architecture, such as a processing device having the Intel® Architecture Core™, an Advanced Micro Devices, Inc. (AMD) processing device, a MIPS-based processing device, an ARM-based processing device design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnects discussed above, which may implement one or more aspects of the described disclosure.

Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the implementations described herein.

In addition, the system illustrates peripherals for communication, such as a Bluetooth module 1270, 3G modem 1275, GPS 1280, and Wi-Fi 1285. Note as stated above, a UE includes a radio for communication. As a result, these peripheral communication modules may not all be included. However, in a UE some form of a radio for external communication should be included.

Figure 13:
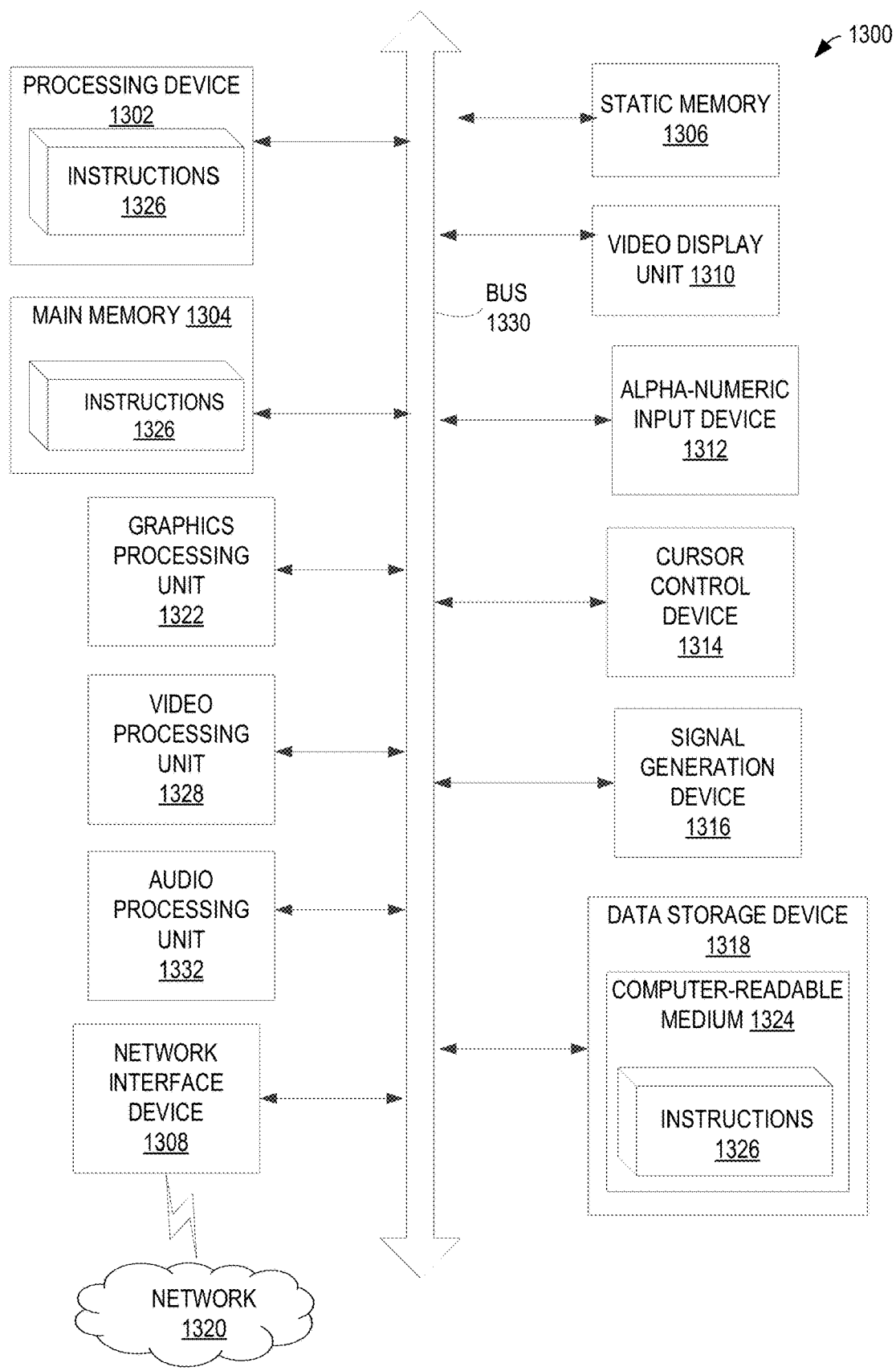
FIG. 13 illustrates another implementation of a block diagram for a computing system.

FIG. 13 illustrates a diagrammatic representation of a machine in the example form of a computing system 1300 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections may be implemented in computing system 1300.

The computing system 1300 includes a processing device 1302, main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessing device, central processing unit, or the like. More particularly, the processing device may be complex instruction set computing (CISC) microprocessing device, reduced instruction set computer (RISC) microprocessing device, very long instruction word (VLIW) microprocessing device, or processing device implementing other instruction sets, or processing devices implementing a combination of instruction sets. Processing device 1302 may also be one or more special-purpose processing devices such as an application specific integrated circuit (ASIC), a field programmable gate array (FPGA), a digital signal processing device (DSP), network processing device, or the like. In one implementation, processing device 1302 may include one or processing device cores. The processing device 1302 is configured to execute instructions 1326 for performing the operations discussed herein. In one implementation, processing device 1302 may be part of the computing system 100 of FIG. 1. Alternatively, the computing system 1300 may include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1300 may further include a network interface device 1308 communicably coupled to a network 1320. The computing system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computing system 1300 may include a graphics processing unit 1322, a video processing unit 1328 and an audio processing unit 1332. In another implementation, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored instructions 1326 embodying any one or more of the methodologies of functions described herein. The instructions 1326 may also reside, completely or at least partially, within the main memory 1304 as instructions 1326 and/or within the processing device 1302 as processing logic during execution thereof by the computing system 1300; the main memory 1304 and the processing device 1302 also constituting computer-readable storage media.

The computer-readable storage medium 1324 may also be used to store instructions 1326 utilizing the processing device 1302, such as described with respect to FIG. 1, and/or a software library containing methods that call the above applications. While the computer-readable storage medium 1324 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the implementations. The term "computer-readable storage medium" shall accordingly be taken to include, but not be limited to, solid-state memories, and optical and magnetic media.

The following examples pertain to further implementations.

Example 1 is a processor comprising: 1) a processor core to execute a hypervisor, the processor core comprising a hardware register to store: a) a bit range to identify a first number of address bits, of physical memory addresses, that define key identifiers (IDs); and b) a partition key ID, of the key IDs, to identify a boundary between non-restricted key IDs and restricted key IDs of the key IDs; and wherein the processor core is to: a) allocate at least one of the non-restricted key IDs for use by the hypervisor; and b) allocate, to a first trust domain of a trust domain infrastructure, a first key ID of the key IDs, wherein the first key ID is one of the restricted key IDs; and 2) a memory controller, coupled to the processor core, to allocate a first physical page of a memory to the first trust domain, wherein data of the first physical page of the memory is to be encrypted with an encryption key associated with the first key ID.

In Example 2, the processor of Example 1, wherein the bit range comprises a first bit sub-range of non-restricted bits and a second bit sub-range of restricted bits, wherein, for the non-restricted key IDs, each of the restricted bits is to have a first binary value, and wherein, for the restricted key IDs, at least one of the restricted bits is to have a second binary value different from the first binary value.

In Example 3, the processor of Example 2, wherein the memory controller is further to: 1) detect a memory transaction directed at the first physical page of the memory allocated to the first trust domain, wherein the memory transaction comprises a physical memory address of the physical page of the memory and a request key ID; and 2) generate a fault in response to a determination that at least one of the restricted bits of the request key ID has the second binary value.

In Example 4, the processor of Example 3, wherein the memory transaction is one of a code fetch or a memory transaction that uses a page walk, and wherein the fault is a non-restricted key page fault.

In Example 5, the processor of Example 1, wherein the memory controller is further to generate a fault in response to detecting a memory transaction initiated by a software program outside a trust computing base (TCB) of the first trust domain and directed at the first physical page of the memory.

In Example 6, the processor of Example 1, wherein the processor core is further to allocate a second key ID to a second trust domain, wherein the second key ID is one of the restricted key IDs, and wherein the memory controller is further to: 1) allocate a second physical page of the memory to the second trust domain, wherein data in the second physical page of the memory is to be encrypted with an encryption key associated with the second key ID; 2) store, in a key ownership table (KOT), allocation of the first key ID to the first trust domain and allocation of the second key ID to the second trust domain; and 3) store, in a memory ownership table (MOT), a first trust domain identifier identifying allocation of the first physical page of the memory to the first trust domain and a second trust domain identifier identifying allocation of the second physical page of the memory to the second trust domain.

In Example 7, the processor of Example 6, wherein the memory controller is further to: 1) detect a memory transaction directed at the first physical page of the memory, wherein the memory transaction comprises a physical memory address of the first physical page of the memory and the second key ID; 2) reference the MOT to determine that the second key ID is not a correct attribute of the first physical page of the memory; and 3) generate a fault.

In Example 8, the processor of Example 6, wherein the memory controller is further to: 1) detect a memory transaction directed at the first physical page of the memory, wherein the memory transaction originates from the second trust domain and comprises a memory address of the first physical page of the memory and the first key ID; 2) reference the KOT to determine that the first key ID is not allocated to the second trust domain; and 3) generate a fault.

In Example 9, the processor of Example 1, wherein the hypervisor is to: 1) mark the first physical page, which is associated with a first physical memory address of the memory, as private, wherein to mark comprises to clear, within a set of EPT for the first trust domain, a value of a shared bit (s-bit) in an entry for a guest physical address associated with the first physical page, 2) translate, using a set of guest page tables, a guest virtual address to the guest physical address, 3) translate, using the extended page tables, the guest physical address to the first physical memory address; 4) retrieve, based on the value of the s-bit in the guest physical address, the first key ID from a secure storage of the processor; and 5) generate a memory transaction comprising the first key ID and the first physical memory address.

In Example 10, the processor of Example 9, wherein the processor core further comprises a multiplexer to select, based on the value of the s-bit, between the first key ID and a second key ID, the second key ID comprising a non-restricted key ID that is appended to a second physical memory address within an entry of the EPT.

In Example 11, the processor of Example 1, wherein the hypervisor is to: 1) allocate a second key ID to the first trust domain, wherein the second key ID is one of the non-restricted key IDs, 2) mark a second physical page, which is associated with a second physical memory address of the memory, as shared, wherein to mark comprises to set, within a set of EPT for the first trust domain, a value of a shared bit (s-bit) in an entry for a guest physical address associated with the second physical page, 3) translate, using a set of guest page tables, a guest virtual address to the guest physical address, 4) translate, using the EPT and based on the value of the s-bit, the guest physical address to obtain a combination of the second physical memory address and the second key ID from an entry in the EPT; and 5) generate a memory transaction comprising the second key ID and the second physical memory address.

Various implementations may have different combinations of the structural features described above. For instance, all optional features of the processors and methods described above may also be implemented with respect to a system described herein and specifics in the examples may be used anywhere in one or more implementations.

Example 12 is a system comprising: 1) a memory device; 2) a hardware register to store: a) a bit range to identify a first number of address bits, of physical memory addresses, that define key identifiers (IDs); and b) a partition key ID, of the key IDs, to identify a boundary between non-restricted key IDs and restricted key IDs of the key IDs; and 3) a processor coupled to the memory device, the processor comprising the hardware register and a memory controller, wherein the processor is to execute a first software program to allocate, to a first trust domain of a trust domain infrastructure, a first key ID of the key IDs, wherein the first key ID is one of the restricted key IDs; and wherein the memory controller is to allocate a first physical page of the memory device to the first trust domain, wherein data of the first physical page of the memory is to be encrypted with an encryption key associated with the first key ID.

In Example 13, the system of Example 12, wherein the first software program is further to allocate a second key ID of the key IDs to a second trust domain, wherein the second key ID is one of the restricted key IDs, and wherein the memory controller is further to allocate a second physical page of the memory to the second trust domain, wherein data in the second physical page of the memory is to be encrypted with an encryption key associated with the second key ID.

In Example 14, the system of Example 13, further comprising a shared hardware device accessible to a second software program operating in the first trust domain, wherein the shared hardware device is further accessible to a third software program operating in the second trust domain, wherein the first software program is further to allocate a shared key ID to both the first trust domain and the second trust domain, wherein the shared key ID is one of the non-restricted key IDs, and wherein an encryption key associated with the shared key ID is to be used for memory transactions that involve the shared hardware device.

In Example 15, the system of Example 14, wherein the shared hardware device is one of an I/O device, a network adapter, a printer, a communication device, or a processing device.

In Example 16, the system of Example 12, wherein the memory controller is further to: 1) detect a memory transaction directed at the first physical page of the memory allocated to the first trust domain, wherein the memory transaction comprises a physical memory address of the first physical page of the memory and a shared key ID; and 2) generate a fault in response to a determination that the shared key ID is a non-restricted key ID.

In Example 17, the system of Example 16, wherein the memory transaction is one of associated with a code fetch or is to employ a page walk to access the physical memory address, and wherein the fault is a non-restricted key page fault.

Various implementations may have different combinations of the structural features described above. For instance, all optional features of the processors and methods described above may also be implemented with respect to a system described herein and specifics in the examples may be used anywhere in one or more implementations.

Example 18 is a method comprising: 1) retrieving, from a hardware register of a processor, a bit range to identify a first number of address bits, of physical memory addresses, that define key identifiers (IDs); and 2) retrieving, from the hardware register, a partition key ID, of the key IDs, to partition the key IDs into non-restricted key IDs and restricted key IDs of the key IDs; 3) executing, by the processor, a hypervisor; 4) allocating, by the processor, at least one of the non-restricted key IDs for use by the hypervisor; 5) allocating, by the hypervisor, to a first trust domain of a trust domain infrastructure, a first key ID of the key IDs, wherein the first key ID is one of the restricted key IDs; and 6) allocating, by a memory controller, a first physical page of a memory to the first trust domain, wherein data in the first physical page of the memory is to be encrypted with an encryption key associated with the first key ID.

In Example 19, the method of Example 18, further including: 1) allocating, by the hypervisor, a second key ID to a second trust domain, wherein the second key ID is one of the restricted key IDs; 2) allocating, by the memory controller, a second physical page of the memory to the second trust domain, wherein data in the second physical page of the memory is to be encrypted with an encryption key associated with the second key ID; 3) storing, by the memory controller, in a key ownership table (KOT), allocation of the first key ID to the first trust domain and allocation of the second key ID to the second trust domain; and 4) storing, by the memory controller, in a memory ownership table (MOT), a first trust domain identifier identifying allocation of the first physical page of the memory to the first trust domain and a second trust domain identifier identifying allocation of the second physical page of the memory to the second trust domain.

In Example 20, the method of Example 19, further comprising: 1) detecting, by the memory controller, a memory transaction directed at the first physical page of the memory, wherein the memory transaction comprises a physical memory address of the first physical page of the memory and the second key ID; 2) referencing, by the memory controller, the MOT to determine that the second key ID is not a correct attribute of the first physical page of the memory; and 3) generating, by memory controller, a fault.

In Example 21, the method of Example 20 further comprising: 1) detecting, by the memory controller, a memory transaction directed at the first physical page of the memory, wherein the memory transaction originates from the second trust domain and comprises a memory address of the first physical page of the memory and the first key ID; 2) referencing, by the memory controller, the KOT to determine that the first key ID is not allocated to the second trust domain; and 3) generating, by the memory controller, a fault.

In Example 22, the method of Example 18, further comprising: 1) marking the first physical page, which is associated with a first physical memory address of the memory, as private, wherein to mark comprises to clear, within a set of EPT for the first trust domain, a value of a E(s-bit) in an entry for a guest physical address associated with the first physical page; 2) translating, using a set of guest page tables, the guest virtual address to the guest physical address; 3) translating, using EPT, the guest physical address to the physical memory address; 4) retrieving, based on the value of the s-bit in the guest physical address, the first key ID; and 5) generating a memory transaction comprising the first key ID and the first physical memory address.

In Example 23, the method of Example 18, further comprising: 1) allocating a second key ID to the first trust domain, wherein the second key ID is one of the non-restricted key IDs; 2) marking a second physical page, which is associated with a second physical memory address of the memory, as shared, wherein to mark comprises to set, within a set of EPT for the first trust domain, a value of a shared bit (s-bit) in an entry for a guest physical address associated with the second physical page, 3) translating, using a set of guest page tables, a guest virtual address to the guest physical address, 4) translating, using the EPT and based on the value of the s-bit, the guest physical address to obtain a combination of the second physical memory address and the second key ID from an entry in the EPT; and 5) generating a memory transaction comprising the second key ID and the second physical memory address.

Various implementations may have different combinations of the structural features described above. For instance, all optional features of the processors and methods described above may also be implemented with respect to a system described herein and specifics in the examples may be used anywhere in one or more implementations.

Example 24 is a non-transitory computer-readable medium storing instructions, which when executed by a processor having a core coupled to a system memory, cause the processor to execute a plurality of logic operations comprising: 1) retrieving, from a hardware register of a processor, a bit range to identify a first number of address bits, of physical memory addresses, that define key identifiers (IDs); and 2) retrieving, from the hardware register, a partition key ID, of the key IDs, to partition the key IDs into non-restricted key IDs and restricted key IDs of the key IDs; 3) executing, by the processor, a hypervisor; 4) allocating, by the processor, at least one of the non-restricted key IDs for use by the hypervisor; 5) allocating, by the hypervisor, to a first trust domain of a trust domain infrastructure, a first key ID of the key IDs, wherein the first key ID is one of the restricted key IDs; and 6) allocating, by a memory controller, a first physical page of a memory to the first trust domain, wherein data in the first physical page of the memory is to be encrypted with an encryption key associated with the first key ID.

In Example 25, the non-transitory computer-readable medium of Example 24, wherein the operations further comprise: 1) allocating, by the hypervisor, a second key ID to a second trust domain, wherein the second key ID is one of the restricted key IDs; 2) allocating, by the memory controller, a second physical page of the memory to the second trust domain, wherein data in the second physical page of the memory is to be encrypted with an encryption key associated with the second key ID; 3) storing, by the memory controller, in a key ownership table (KOT), allocation of the first key ID to the first trust domain and allocation of the second key ID to the second trust domain; and 4) storing, by the memory controller, in a memory ownership table (MOT), a first trust domain identifier identifying allocation of the first physical page of the memory to the first trust domain and a second trust domain identifier identifying allocation of the second physical page of the memory to the second trust domain.

In Example 26, the non-transitory computer-readable medium of Example 25, wherein the operations further comprise: 1) detecting, by the memory controller, a memory transaction directed at the first physical page of the memory, wherein the memory transaction comprises a physical memory address of the first physical page of the memory and the second key ID; 2) referencing, by the memory controller, the MOT to determine that the second key ID is not a correct attribute of the first physical page of the memory; and 3) generating, by memory controller, a fault.

In Example 27, the non-transitory computer-readable medium of Example 26, wherein the operations further comprise: 1) detecting, by the memory controller, a memory transaction directed at the first physical page of the memory, wherein the memory transaction originates from the second trust domain and comprises a memory address of the first physical page of the memory and the first key ID; 2) referencing, by the memory controller, the KOT to determine that the first key ID is not allocated to the second trust domain; and 3) generating, by the memory controller, a fault.

In Example 28, the non-transitory computer-readable medium of Example 24, wherein the operations further comprise: 1) marking the first physical page, which is associated with a first physical memory address of the memory, as private, wherein to mark comprises to clear, within a set of EPT for the first trust domain, a value of a shared bit (s-bit) in an entry for a guest physical address associated with the first physical page; 2) translating, using a set of guest page tables, a guest virtual address to the guest physical address; 3) translating, using the EPT, the guest physical address to the first physical memory address; 4) retrieving, based on the value of the s-bit in the guest physical address, the first key ID; and 5) generating a memory transaction comprising the first key ID and the first physical memory address.

In Example 29, the non-transitory computer-readable medium of Example 24, wherein the operations further comprise: 1) allocating a second key ID to the first trust domain, wherein the second key ID is one of the non-restricted key IDs; 2) marking a second physical page, which is associated with a second physical memory address of the memory, as shared, wherein to mark comprises to set, within a set of EPT for the first trust domain, a value of a shared bit (s-bit) in an entry for a guest physical address associated with the second physical page; 3) translating, using a set of guest page tables, a guest virtual address to the guest physical address; 4) translating, using EPT and based on the value of the s-bit, the guest physical address to obtain a combination of the second physical memory address and the second key ID from an entry in the EPT; and 5) generating a memory transaction comprising the second key ID and the second physical memory address.

Various implementations may have different combinations of the structural features described above. For instance, all optional features of the processors and methods described above may also be implemented with respect to a system described herein and specifics in the examples may be used anywhere in one or more implementations.

Example 30 is a system comprising: 1) means for retrieving, from a hardware register of a processor, a bit range to identify a first number of address bits, of physical memory addresses, that define key identifiers (IDs); and 2) means for retrieving, from the hardware register, a partition key ID, of the key IDs, to partition the key IDs into non-restricted key IDs and restricted key IDs of the key IDs; 3) means for executing, by the processor, a hypervisor; 4) means for allocating, by the processor, at least one of the non-restricted key IDs for use by the hypervisor; 5) means for allocating, by the hypervisor, to a first trust domain of a trust domain infrastructure, a first key ID of the key IDs, wherein the first key ID is one of the restricted key IDs; and 6) means for allocating, by a memory controller, a first physical page of a memory to the first trust domain, wherein data in the first physical page of the memory is to be encrypted with an encryption key associated with the first key ID.

In Example 31, the system of Example 30, further including: 1) means for allocating, by the hypervisor, a second key ID to a second trust domain, wherein the second key ID is one of the restricted key IDs; 2) means for allocating, by the memory controller, a second physical page of the memory to the second trust domain, wherein data in the second physical page of the memory is to be encrypted with an encryption key associated with the second key ID; 3) means for storing, by the memory controller, in a key ownership table (KOT), allocation of the first key ID to the first trust domain and allocation of the second key ID to the second trust domain; and 4) means for storing, by the memory controller, in a memory ownership table (MOT), a first trust domain identifier identifying allocation of the first physical page of the memory to the first trust domain and a second trust domain identifier identifying allocation of the second physical page of the memory to the second trust domain.

In Example 32, the system of Example 31, further comprising: 1) means for detecting, by the memory controller, a memory transaction directed at the first physical page of the memory, wherein the memory transaction comprises a physical memory address of the first physical page of the memory and the second key ID; 2) means for referencing, by the memory controller, the MOT to determine that the second key ID is not a correct attribute of the first physical page of the memory; and 3) means for generating, by memory controller, a fault.

In Example 33, the system of Example 32, further comprising: 1) means for detecting, by the memory controller, a memory transaction directed at the first physical page of the memory, wherein the memory transaction originates from the second trust domain and comprises a memory address of the first physical page of the memory and the first key ID; 2) means for referencing, by the memory controller, the KOT to determine that the first key ID is not allocated to the second trust domain; and 3) means for generating, by the memory controller, a fault.

In Example 34, the method of Example 30, further comprising: 1) means for marking the first physical page, which is associated with a first physical memory address of the memory, as private, wherein to mark comprises to clear, within a set of EPT for the first trust domain, a value of a shared bit (s-bit) in an entry for a guest physical address associated with the first physical page; 2) means for translating, using a set of guest page tables, a guest virtual address to the guest physical address; 3) means for translating, using the EPT, the guest physical address to the first physical memory address; 4) means for retrieving, based on the value of the s-bit in the guest physical address, the first key ID; and 5) means for generating a memory transaction comprising the first key ID and the first physical memory address.

In Example 35, the system of Example 30, further comprising: 1) means for allocating a second key ID to the first trust domain, wherein the second key ID is one of the non-restricted key IDs; 2) means for marking a second physical page, which is associated with a second physical memory address of the memory, as shared, wherein to mark comprises to set, within a set of EPT for the first trust domain, a value of a shared bit (s-bit) in an entry for a guest physical address associated with the second physical page; 3) means for translating, using a set of guest page tables, a guest virtual address to the guest physical address; 4) means for translating, using the EPT and based on the value of the s-bit, the guest physical address to obtain a combination of the second physical memory address and the second key ID from an entry in the EPT; and 5) means for generating a memory transaction comprising the second key ID and the second physical memory address.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processing devices and system configurations, specific hardware structures, specific architectural and micro architectural details, specific register configurations, specific instruction types, specific system components, specific measurements/heights, specific processing device pipeline stages and operation etc. in order to provide a thorough understanding of the disclosure. It will be apparent, however, to one skilled in the art that these specific details need not be employed to practice the disclosure. In other instances, well known components or methods, such as specific and alternative processing device architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the disclosure.

The implementations are described with reference to providing co-existence of trust domain architecture with multi-key total memory encryption technology in virtualized systems using trust domains in specific integrated circuits, such as in computing platforms or microprocessing devices. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that may perform the functions and operations taught below. It is described that the system may be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processing device, other implementations are applicable to other types of integrated circuits and logic devices. Similar techniques and teachings of implementations of the disclosure may be applied to other types of circuits or semiconductor devices that may benefit from higher pipeline throughput and improved performance. The teachings of implementations of the disclosure are applicable to any processing device or machine that performs data manipulations. However, the disclosure is not limited to processing devices or machines that perform 512 bit, 256 bit, 128 bit, 64 bit, 32 bit, or 16 bit data operations and may be applied to any processing device and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the below examples describe instruction handling and distribution in the context of execution units and logic circuits, other implementations of the disclosure may be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions may be used to cause a general-purpose or special-purpose processing device that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from. Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
a processor core to execute a hypervisor, the processor core comprising a hardware register to store:
a bit range to identify a first number of address bits, of physical memory addresses, that define key identifiers (IDs); and
a partition key ID, of the key IDs, to identify a boundary between non-restricted key IDs and restricted key IDs of the key IDs; and
wherein the processor core is to:
allocate at least one of the non-restricted key IDs for use by the hypervisor; and
allocate, to a first trust domain of a trust domain infrastructure, a first key ID of the key IDs, wherein the first key ID is one of the restricted key IDs; and
a memory controller, coupled to the processor core, to allocate a first physical page of a memory to the first trust domain, wherein data of the first physical page of the memory is to be encrypted with an encryption key associated with the first key ID.

2. The processor of claim 1, wherein the bit range comprises a first bit sub-range of non-restricted bits and a second bit sub-range of restricted bits, wherein, for the non-restricted key IDs, each of the restricted bits is to have a first binary value, and wherein, for the restricted key IDs, at least one of the restricted bits is to have a second binary value different from the first binary value.

3. The processor of claim 2, wherein the memory controller is further to:
detect a memory transaction directed at the first physical page of the memory allocated to the first trust domain, wherein the memory transaction comprises a physical memory address of the physical page of the memory and a request key ID; and
generate a fault in response to a determination that at least one of the restricted bits of the request key ID has the second binary value.

4. The processor of claim 3, wherein the memory transaction is one of a code fetch or a memory transaction that uses a page walk, and wherein the fault is a non-restricted key page fault.

5. The processor of claim 1, wherein the memory controller is further to generate a fault in response to detecting a memory transaction initiated by a software program outside a trust computing base (TCB) of the first trust domain and directed at the first physical page of the memory.

6. The processor of claim 1, wherein the processor core is further to allocate a second key ID to a second trust domain, wherein the second key ID is one of the restricted key IDs, and wherein the memory controller is further to:
allocate a second physical page of the memory to the second trust domain, wherein data in the second physical page of the memory is to be encrypted with an encryption key associated with the second key ID;
store, in a key ownership table (KOT), allocation of the first key ID to the first trust domain and allocation of the second key ID to the second trust domain; and
store, in a memory ownership table (MOT), a first trust domain identifier identifying allocation of the first physical page of the memory to the first trust domain and a second trust domain identifier identifying allocation of the second physical page of the memory to the second trust domain.

7. The processor of claim 6, wherein the memory controller is further to:
detect a memory transaction directed at the first physical page of the memory, wherein the memory transaction comprises a physical memory address of the first physical page of the memory and the second key ID;
reference the MOT to determine that the second key ID is not a correct attribute of the first physical page of the memory; and
generate a fault.

8. The processor of claim 6, wherein the memory controller is further to:
detect a memory transaction directed at the first physical page of the memory, wherein the memory transaction originates from the second trust domain and comprises a memory address of the first physical page of the memory and the first key ID;
reference the KOT to determine that the first key ID is not allocated to the second trust domain; and
generate a fault.

9. The processor of claim 1, wherein the hypervisor is to:
mark the first physical page, which is associated with a first physical memory address of the memory, as private, wherein to mark comprises to clear, within a set of extended page tables (EPT) for the first trust domain, a value of a shared bit (s-bit) in an entry for a guest physical address associated with the first physical page;
translate, using a set of guest page tables, a guest virtual address to the guest physical address;
translate, using the EPT, the guest physical address to the first physical memory address;
retrieve, based on the value of the s-bit in the guest physical address, the first key ID from a secure storage of the processor; and
generate a memory transaction comprising the first key ID and the first physical memory address.

10. The processor of claim 9, wherein the processor core further comprises a multiplexer to select, based on the value of the s-bit, between the first key ID and a second key ID, the second key ID comprising a non-restricted key ID that is appended to a second physical memory address within an entry of the EPT.

11. The processor of claim 1, wherein the hypervisor is to:
allocate a second key ID to the first trust domain, wherein the second key ID is one of the non-restricted key IDs;
mark a second physical page, which is associated with a second physical memory address of the memory, as shared, wherein to mark comprises to set, within a set of extended guest page tables (EPT) for the first trust domain, a value of a shared bit (s-bit) in an entry for a guest physical address associated with the second physical page;

translate, using a set of guest page tables, a guest virtual address to the guest physical address;

translate, using the EPT and based on the value of the s-bit, the guest physical address to obtain a combination of the second physical memory address and the second key ID from an entry in the EPT; and generate a memory transaction comprising the second key ID and the second physical memory address.

12. A system comprising:
a memory device;
a hardware register to store:
   a bit range to identify a first number of address bits, of physical memory addresses, that define key identifiers (IDs); and
   a partition key ID, of the key IDs, to identify a boundary between non-restricted key IDs and restricted key IDs of the key IDs; and
   a processor coupled to the memory device, the processor comprising the hardware register and a memory controller, wherein the processor is to execute a first software program to allocate, to a first trust domain of a trust domain infrastructure, a first key ID of the key IDs, wherein the first key ID is one of the restricted key IDs; and
wherein the memory controller is to allocate a first physical page of the memory device to the first trust domain, wherein data of the first physical page of the memory is to be encrypted with an encryption key associated with the first key ID.

13. The system of claim 12, wherein the first software program is further to allocate a second key ID of the key IDs to a second trust domain, wherein the second key ID is one of the restricted key IDs, and wherein the memory controller is further to allocate a second physical page of the memory to the second trust domain, wherein data in the second physical page of the memory is to be encrypted with an encryption key associated with the second key ID.

14. The system of claim 13, further comprising a shared hardware device accessible to a second software program operating in the first trust domain, wherein the shared hardware device is further accessible to a third software program operating in the second trust domain, wherein the first software program is further to allocate a shared key ID to both the first trust domain and the second trust domain, wherein the shared key ID is one of the non-restricted key IDs, and wherein an encryption key associated with the shared key ID is to be used for memory transactions that involve the shared hardware device.

15. The system of claim 14, wherein the shared hardware device is one of an I/O device, a network adapter, a printer, a communication device, or a processing device.

16. The system of claim 12, wherein the memory controller is further to:
detect a memory transaction directed at the first physical page of the memory allocated to the first trust domain, wherein the memory transaction comprises a physical memory address of the first physical page of the memory and a shared key ID; and
generate a fault in response to a determination that the shared key ID is a non-restricted key ID.

17. The system of claim 16, wherein the memory transaction is one of associated with a code fetch or is to employ a page walk to access the physical memory address, and wherein the fault is a non-restricted key page fault.

18. A method comprising:
retrieving, from a hardware register of a processor, a bit range to identify a first number of address bits, of physical memory addresses, that define key identifiers (IDs); and
retrieving, from the hardware register, a partition key ID, of the key IDs, to partition the key IDs into non-restricted key IDs and restricted key IDs of the key IDs;
executing, by the processor, a hypervisor;
allocating, by the processor, at least one of the non-restricted key IDs for use by the hypervisor;
allocating, by the hypervisor, to a first trust domain of a trust domain infrastructure, a first key ID of the key IDs, wherein the first key ID is one of the restricted key IDs; and
allocating, by a memory controller, a first physical page of a memory to the first trust domain, wherein data in the first physical page of the memory is to be encrypted with an encryption key associated with the first key ID.

19. The method of claim 18, further including:
allocating, by the hypervisor, a second key ID to a second trust domain, wherein the second key ID is one of the restricted key IDs;
allocating, by the memory controller, a second physical page of the memory to the second trust domain, wherein data in the second physical page of the memory is to be encrypted with an encryption key associated with the second key ID;
storing, by the memory controller, in a key ownership table (KOT), allocation of the first key ID to the first trust domain and allocation of the second key ID to the second trust domain; and
storing, by the memory controller, in a memory ownership table (MOT), a first trust domain identifier identifying allocation of the first physical page of the memory to the first trust domain and a second trust domain identifier identifying allocation of the second physical page of the memory to the second trust domain.

20. The method of claim 19, further comprising:
detecting, by the memory controller, a memory transaction directed at the first physical page of the memory, wherein the memory transaction comprises a physical memory address of the first physical page of the memory and the second key ID;
referencing, by the memory controller, the MOT to determine that the second key ID is not a correct attribute of the first physical page of the memory; and
generating, by memory controller, a fault.

21. The method of claim 20 further comprising:
detecting, by the memory controller, a memory transaction directed at the first physical page of the memory, wherein the memory transaction originates from the second trust domain and comprises a memory address of the first physical page of the memory and the first key ID;
referencing, by the memory controller, the KOT to determine that the first key ID is not allocated to the second trust domain; and
generating, by the memory controller, a fault.

22. The method of claim 18, further comprising:
marking the first physical page, which is associated with a first physical memory address of the memory, as private, wherein to mark comprises to clear, within a set of extended page tables (EPT) for the first trust domain, a value of a shared bit (s-bit) in an entry for a guest physical address associated with the first physical page;

translating, using a set of guest page tables, a guest virtual address to the guest physical address;
translating, using the EPT, the guest physical address to the first physical memory address;
retrieving, based on the value of the s-bit in the guest physical address, the first key ID; and
generating a memory transaction comprising the first key ID and the first physical memory address.

23. The method of claim 18, further comprising:
allocating a second key ID to the first trust domain, wherein the second key ID is one of the non-restricted key IDs;
marking a second physical page, which is associated with a second physical memory address of the memory, as shared, wherein to mark comprises to set, within a set of extended page tables (EPT) for the first trust domain, a value of a shared bit (s-bit) in an entry for a guest physical address associated with the second physical page;
translating, using a set of guest page tables, a guest virtual address to the guest physical address;
translating, using the EPT and based on the value of the s-bit, the guest physical address to obtain a combination of the second physical memory address and the second key ID from an entry in the EPT; and
generating a memory transaction comprising the second key ID and the second physical memory address.

* * * * *